(12) United States Patent
O'Connor

(10) Patent No.: US 12,324,983 B2
(45) Date of Patent: Jun. 10, 2025

(54) UNIVERSAL MOBILE GAME CONTROLLER

(71) Applicant: Backbone Labs, Inc., Vancouver, WA (US)

(72) Inventor: Shawn O'Connor, Portland, OR (US)

(73) Assignee: Backbone Labs, Inc., Vancouver, WA (US)

( * ) Notice: Subject to any disclaimer, the term of this patent is extended or adjusted under 35 U.S.C. 154(b) by 286 days.

(21) Appl. No.: 18/136,509

(22) Filed: Apr. 19, 2023

(65) Prior Publication Data

US 2024/0207724 A1    Jun. 27, 2024

Related U.S. Application Data

(60) Provisional application No. 63/435,089, filed on Dec. 23, 2022.

(51) Int. Cl.
*A63F 13/24* (2014.01)
*A63F 13/92* (2014.01)

(52) U.S. Cl.
CPC .............. *A63F 13/24* (2014.09); *A63F 13/92* (2014.09)

(58) Field of Classification Search
CPC ................................ A63F 13/24; A63F 13/92
USPC .......................................................... 463/37
See application file for complete search history.

(56) References Cited

U.S. PATENT DOCUMENTS

| | | |
|---|---|---|
| 3,536,908 A | 10/1970 | Oster |
| 4,636,593 A | 1/1987 | Novak |
| 6,238,289 B1 | 5/2001 | Sobota |
| 6,640,268 B1 | 10/2003 | Kumar |
| 6,684,062 B1 | 1/2004 | Gosior |
| 6,761,462 B2 | 7/2004 | Yoshida |
| 6,965,368 B1 | 11/2005 | Andrews et al. |
| 7,477,239 B2 | 1/2009 | Ray |
| 7,580,728 B2 | 8/2009 | Vance et al. |
| 7,905,627 B2 | 3/2011 | Chiang |
| 8,462,810 B2 | 6/2013 | Spinar |
| 8,760,394 B2 | 6/2014 | Chiang |
| 8,822,851 B2 | 9/2014 | Walker |
| 9,053,243 B2 | 6/2015 | Townsend |
| 9,677,740 B2 | 6/2017 | Steiner |
| 9,848,324 B1 * | 12/2017 | Abene ................ H04W 12/068 |

(Continued)

FOREIGN PATENT DOCUMENTS

| | | |
|---|---|---|
| CA | 3169951 A1 | 9/2021 |
| CN | 101739162 A | 6/2010 |

(Continued)

OTHER PUBLICATIONS

US 12,029,974 B1, 07/2024, Maker (withdrawn)

(Continued)

*Primary Examiner* — Michael A Cuff
(74) *Attorney, Agent, or Firm* — Crowell & Moring LLP

(57) ABSTRACT

A universal mobile game controller is provided that can interoperate with multiple computing device operating systems (e.g., Android and iOS) in an automatic way through a common connector (e.g., USB-C). With these embodiments, instead of building a separate mobile game controller for each operating system, a single mobile game controller can be used for all operating systems. These embodiments can also enable communication with an application running within the computing device operating system. Other embodiments are provided.

16 Claims, 21 Drawing Sheets

(56) References Cited

U.S. PATENT DOCUMENTS

| | | |
|---|---|---|
| 10,025,644 B2 | 7/2018 | Iwaya et al. |
| 10,258,876 B2 | 4/2019 | Wells et al. |
| 10,259,384 B2 | 4/2019 | Teng |
| 10,300,386 B1 | 5/2019 | Leung et al. |
| 10,391,393 B2 | 8/2019 | Townley |
| 10,483,969 B2 | 11/2019 | Kontani |
| 10,599,233 B1 | 3/2020 | Amalou |
| 10,725,557 B2 | 7/2020 | Kontani |
| 10,741,215 B1 | 8/2020 | Sundareson |
| 10,751,612 B1 | 8/2020 | Urbanus |
| 10,868,436 B1 | 12/2020 | Chen |
| 10,893,125 B2 | 1/2021 | Ma |
| 11,000,759 B2 | 5/2021 | Palmer et al. |
| 11,027,191 B2 | 6/2021 | Oh |
| 11,045,723 B1* | 6/2021 | Lee ................ A63F 13/24 |
| 11,090,557 B2 | 8/2021 | Downs et al. |
| 11,105,969 B2 | 8/2021 | Sasagawa |
| 11,167,209 B2 | 11/2021 | Lu |
| 11,389,721 B2 | 7/2022 | Khaira et al. |
| 11,395,961 B2 | 7/2022 | Chung |
| 11,528,987 B1 | 12/2022 | Girault |
| 11,662,855 B1 | 5/2023 | Sorensen et al. |
| 11,707,670 B2 | 7/2023 | Khaira et al. |
| 11,819,756 B2 | 11/2023 | Lu |
| 11,826,642 B2 | 11/2023 | Khaira et al. |
| 11,839,810 B2 | 12/2023 | Khaira et al. |
| 11,853,505 B1 | 12/2023 | Sorensen et al. |
| 12,070,678 B2 | 8/2024 | Maker |
| 12,074,946 B2 | 8/2024 | Wei et al. |
| 12,115,443 B2 | 10/2024 | Khaira et al. |
| 12,121,800 B2 | 10/2024 | Maker |
| 12,145,052 B2 | 11/2024 | Khaira et al. |
| 12,145,053 B2 | 11/2024 | Khaira et al. |
| 12,194,374 B2 | 1/2025 | Khaira |
| 12,263,400 B2 | 4/2025 | Lake et al. |
| 12,268,956 B2 | 4/2025 | Khaira |
| 2002/0173354 A1 | 11/2002 | Winans |
| 2005/0017953 A1 | 1/2005 | Pekka |
| 2005/0172045 A1 | 8/2005 | Bermudez et al. |
| 2005/0221894 A1* | 10/2005 | Lum ................ A63F 13/235 463/37 |
| 2005/0243585 A1 | 11/2005 | Marchant |
| 2005/0247550 A1 | 11/2005 | Hamada |
| 2006/0132458 A1 | 6/2006 | Garfio |
| 2006/0234794 A1 | 10/2006 | Baseflug et al. |
| 2006/0236002 A1 | 10/2006 | Valenci |
| 2007/0091633 A1 | 4/2007 | Harrity |
| 2007/0152965 A1 | 7/2007 | Krzyzanowski |
| 2007/0155511 A1 | 7/2007 | Grundstedt |
| 2007/0233291 A1 | 10/2007 | Herde |
| 2007/0236959 A1 | 10/2007 | Tolbert |
| 2008/0202907 A1 | 8/2008 | Kyowski |
| 2008/0294453 A1 | 11/2008 | Baird-Smith |
| 2009/0065337 A1 | 3/2009 | Chiang |
| 2009/0077277 A1 | 3/2009 | Vidal |
| 2009/0219734 A1 | 9/2009 | Sawada |
| 2009/0284397 A1 | 11/2009 | Lee |
| 2010/0067424 A1 | 3/2010 | Sun |
| 2010/0115050 A1 | 5/2010 | Sultenfuss |
| 2010/0137033 A1 | 6/2010 | Lee |
| 2010/0271839 A1 | 10/2010 | Chan |
| 2011/0014984 A1 | 1/2011 | Penman et al. |
| 2011/0084904 A1 | 4/2011 | Tan |
| 2012/0145522 A1 | 6/2012 | Lee |
| 2012/0200475 A1 | 8/2012 | Baker |
| 2012/0225258 A1 | 9/2012 | Hill |
| 2013/0033829 A1 | 2/2013 | Furubo et al. |
| 2013/0077346 A1 | 3/2013 | Chen |
| 2013/0191625 A1 | 7/2013 | Mullens et al. |
| 2013/0225288 A1 | 8/2013 | Levin et al. |
| 2013/0237322 A1 | 9/2013 | Sobel |
| 2014/0018173 A1 | 1/2014 | Urhman |
| 2014/0024392 A1 | 1/2014 | Su |
| 2014/0109133 A1* | 4/2014 | Kitazato ............ H04N 21/8586 725/32 |
| 2014/0125619 A1 | 5/2014 | Panther et al. |
| 2014/0161417 A1 | 6/2014 | Kurupacheril |
| 2014/0184508 A1 | 7/2014 | Tamasi et al. |
| 2014/0274394 A1 | 9/2014 | Willis |
| 2014/0304494 A1 | 10/2014 | Hawver |
| 2014/0317329 A1 | 10/2014 | Barnett et al. |
| 2014/0365214 A1* | 12/2014 | Bayley ................ G06F 3/1454 704/235 |
| 2014/0375545 A1 | 12/2014 | Ackerman et al. |
| 2015/0018101 A1 | 1/2015 | Schoenith |
| 2015/0031452 A1 | 1/2015 | Rundell |
| 2015/0128042 A1 | 5/2015 | Churchill et al. |
| 2015/0217191 A1 | 8/2015 | Yan |
| 2015/0273325 A1 | 10/2015 | Falc et al. |
| 2015/0281422 A1 | 10/2015 | Kessler et al. |
| 2016/0132114 A1 | 5/2016 | Rihn |
| 2016/0180811 A1 | 6/2016 | Colenbrander |
| 2016/0317919 A1 | 11/2016 | Gassoway et al. |
| 2016/0329533 A1 | 11/2016 | Tajima |
| 2017/0056762 A1 | 3/2017 | Gafni |
| 2017/0205881 A1 | 7/2017 | Yamashita |
| 2018/0004250 A1 | 1/2018 | Barnett et al. |
| 2018/0056176 A1 | 3/2018 | Sakamoto |
| 2018/0070389 A1* | 3/2018 | Morgan ................ H04W 76/10 |
| 2018/0097860 A1 | 4/2018 | Daly |
| 2018/0121655 A1* | 5/2018 | Abene ................ H04W 12/068 |
| 2018/0133594 A1 | 5/2018 | Guo |
| 2018/0250588 A1 | 9/2018 | Winick |
| 2018/0345136 A1 | 12/2018 | Schmitz et al. |
| 2018/0359246 A1 | 12/2018 | Dannemiller et al. |
| 2018/0369692 A1 | 12/2018 | Winick |
| 2019/0079584 A1 | 3/2019 | Bonanno et al. |
| 2019/0080549 A1 | 3/2019 | Lewis |
| 2019/0230400 A1 | 7/2019 | Van Os |
| 2019/0358534 A1 | 11/2019 | Fang et al. |
| 2019/0379231 A1 | 12/2019 | Gonzalez et al. |
| 2020/0155928 A1 | 5/2020 | Guo |
| 2020/0206636 A1 | 7/2020 | Schultz et al. |
| 2020/0278758 A1 | 9/2020 | McAllen |
| 2020/0282309 A1 | 9/2020 | Liao |
| 2020/0353351 A1 | 11/2020 | Mao |
| 2020/0353369 A1 | 11/2020 | Esselstrom |
| 2020/0406140 A1 | 12/2020 | Sundareson |
| 2021/0093951 A1 | 4/2021 | Mahlmeister et al. |
| 2021/0104907 A1 | 4/2021 | Chen |
| 2021/0154584 A1 | 5/2021 | O'Connor et al. |
| 2021/0197082 A1 | 7/2021 | Seibert et al. |
| 2021/0200501 A1* | 7/2021 | Stankoulov ........... G06F 3/0488 |
| 2021/0205699 A1 | 7/2021 | Chung |
| 2021/0275907 A1 | 9/2021 | Khaira et al. |
| 2021/0299553 A1 | 9/2021 | Lu et al. |
| 2021/0308566 A1 | 10/2021 | Kong et al. |
| 2022/0032178 A1 | 2/2022 | Khaira et al. |
| 2022/0032179 A1 | 2/2022 | Khaira et al. |
| 2022/0032180 A1 | 2/2022 | Khaira et al. |
| 2022/0096923 A1 | 3/2022 | O'Leary et al. |
| 2022/0135273 A1 | 5/2022 | Malone |
| 2022/0317798 A1 | 10/2022 | Stryker |
| 2022/0323857 A1 | 10/2022 | Khaira et al. |
| 2022/0331688 A1 | 10/2022 | Khaira et al. |
| 2022/0339533 A1 | 10/2022 | Schoenith |
| 2022/0347563 A1 | 11/2022 | Khaira et al. |
| 2022/0347564 A1 | 11/2022 | Khaira et al. |
| 2022/0382559 A1 | 12/2022 | Tu et al. |
| 2022/0395754 A1 | 12/2022 | Ballard |
| 2022/0401834 A1 | 12/2022 | Benedetto |
| 2023/0105605 A1 | 4/2023 | Lu et al. |
| 2023/0271082 A1 | 8/2023 | Khaira et al. |
| 2023/0356076 A1 | 11/2023 | Maker |
| 2024/0149148 A1 | 5/2024 | O'Connor |
| 2024/0149151 A1 | 5/2024 | Chow |
| 2024/0149163 A1 | 5/2024 | O'Connor |
| 2024/0149174 A1 | 5/2024 | Donlan |
| 2024/0155033 A1 | 5/2024 | Wei |
| 2024/0157258 A1 | 5/2024 | Maker |
| 2024/0207721 A1 | 6/2024 | O'Connor |
| 2024/0207722 A1 | 6/2024 | Maker |
| 2024/0207723 A1 | 6/2024 | Maker |
| 2024/0207724 A1 | 6/2024 | O'Connor |

(56) References Cited

U.S. PATENT DOCUMENTS

| | | |
|---|---|---|
| 2024/0207725 A1 | 6/2024 | O'Connor |
| 2024/0226721 A1 | 7/2024 | Lake et al. |
| 2024/0307760 A1 | 9/2024 | Aldridge et al. |
| 2024/0333804 A1 | 10/2024 | Wei et al. |
| 2024/0390786 A1 | 11/2024 | Aldridge et al. |
| 2025/0025773 A1 | 1/2025 | Maker |
| 2025/0025776 A1 | 1/2025 | Maker |
| 2025/0032900 A1 | 1/2025 | Khaira |
| 2025/0032901 A1 | 1/2025 | Boegli |
| 2025/0032903 A1 | 1/2025 | Khaira |
| 2025/0032904 A1 | 1/2025 | Khaira |
| 2025/0041712 A1 | 2/2025 | Khaira |
| 2025/0058213 A1 | 2/2025 | Khaira et al. |
| 2025/0090945 A1 | 3/2025 | Koch et al. |
| 2025/0090946 A1 | 3/2025 | Koch et al. |
| 2025/0090947 A1 | 3/2025 | Khaira et al. |

FOREIGN PATENT DOCUMENTS

| | | | |
|---|---|---|---|
| CN | 204129699 U | 1/2015 | |
| CN | 106356228 A | 1/2017 | |
| CN | 107008005 A | 8/2017 | |
| CN | 207532765 U | 6/2018 | |
| CN | 207838250 U | 9/2018 | |
| CN | 208115138 U | 11/2018 | |
| CN | 109062842 A * | 12/2018 | ......... G06F 13/4068 |
| CN | 208636809 U | 3/2019 | |
| CN | 209392718 U | 9/2019 | |
| CN | 113426104 A | 9/2021 | |
| CN | 115427123 A | 12/2022 | |
| CN | 115427123 B | 2/2024 | |
| EP | 1380324 A1 | 1/2004 | |
| EP | 1380324 B1 | 9/2005 | |
| EP | 2025369 A2 | 2/2009 | |
| EP | 2136225 A1 | 12/2009 | |
| EP | 2136225 B1 | 6/2012 | |
| EP | 3224691 B1 | 4/2018 | |
| EP | 3375502 A1 | 9/2018 | |
| EP | 3782709 A1 | 2/2021 | |
| EP | 4114540 A1 | 1/2023 | |
| GB | 2608588 A | 1/2023 | |
| JP | 2004139847 A | 5/2004 | |
| JP | 2014210079 A | 11/2014 | |
| JP | 2023516421 A | 4/2023 | |
| TW | 201036020 A | 10/2010 | |
| WO | WO2009/073819 | 6/2009 | |
| WO | WO2015/072625 | 5/2015 | |
| WO | WO2017/218303 | 12/2017 | |
| WO | WO2021/102146 A1 | 5/2021 | |
| WO | WO 2021/178242 A1 | 9/2021 | |
| WO | WO2022/161834 A1 | 8/2022 | |
| WO | WO 2023/034596 A1 | 3/2023 | |
| WO | WO2023/172202 A1 | 9/2023 | |
| WO | WO2024/006587 A1 | 1/2024 | |
| WO | WO2024/097301 A1 | 5/2024 | |
| WO | WO2024/107651 A1 | 5/2024 | |
| WO | WO2024/107654 A1 | 5/2024 | |
| WO | WO2024/137106 A1 | 6/2024 | |
| WO | WO2024/148214 A1 | 7/2024 | |
| WO | WO2024/248845 A1 | 12/2024 | |
| WO | WO 2025/029566 A1 | 2/2025 | |
| WO | WO2025/042684 A1 | 2/2025 | |
| WO | WO2025/058942 A1 | 3/2025 | |

OTHER PUBLICATIONS

US 12,047,455 B2, 07/2024, Wei et al. (withdrawn)

Jovanee, Alice, The new 8BitDo Ultimate controller comes in October, https://www.theverge.com/2022/8/30/23326887/8bitdo-ultimate-pro-controller-bluetooth-preorder-nintendo-switch-wireless, Aug. 30, 2022 (Year: 2022).*

Lon.tv, GameSir X2 USB-C Android Game Controller Review (Newest Version), https://www.youtube.com/watch?v=9Kzytm8D6qk, Nov. 24, 2021 (Year: 2021).*

Retro Game Corps, "This Controller Could Change Mobile Gaming" (youtube.com), Oct. 3, 2024, obtained from the Internet on Oct. 10, 2024; URL: https://www.youtube.com/watch?v=J3969hkkFSE, 21 pages.

GameSir G8 Plus Bluetooth Mobile Controller—Big Enough As You Want—GameSir Official Store, obtained from the Internet on Oct. 10, 2024; URL: https://www.gamesir.hk/blogs/news/gamesir-g8-plus-bluetooth-mobile-controller-big-enough-as-you-want, 8 pages.

Kyle Bradshaw, GameSir G8 Galileo Review: The mobile controller I've dreamed of (9to5google.com), obtained from the Internet on Oct. 10, 2024; URL: https://9to5google.com/2024/01/25/review-gamesir-g8-galileo-android-ios/, 12 pages.

Nintendo Switch—Nintendo—Official Site, obtained from the Internet on Oct. 10, 2024; URL: https://www.nintendo.com/us/switch/system/, 17 pages.

Nintendo switch internal—Search Images (bing.com), obtained from the Internet on Oct. 10, 2024; URL: https://www.bing.com/images/search?view=detailV2&ccid=87gF12WI&id=31A64F955C01D87035FBF76FC2B1082808CDF4C2&thid=OIP.87gF12WIjRYTL2hDhEBZtQAAAA&mediaurl=https%3a%2f%2fwww.allaboutcircuits.com%2fuploads%2farticles%2fMouser_IA_Switch_figure5.jpg&cdnurl=https%3a%2f%2fth.bing.com%2fth%2fid%2fR.f3b805d765888d16132f6843844059b5%3frik%3dwvTNCCglsJv9w%26pid%3dlmgRaw%26r%3d0&exph=355&expw=474&q=ninetnedo+switch+internal&simid=608038160133663134&FORM=IRPRST&ck=C6F7BED9A8A0BA549A06B2B38B157AFA&selectedIndex=1&itb=0&ajaxhist=0&ajaxser=0, 4 pages.

U.S. Appl. No. 18/734,411, filed Jun. 2024, Maker.

U.S. Appl. No. 18/777,919, filed Jul. 2024, Khaira et al.

U.S. Appl. No. 18/805,902, filed Aug. 2024, Khaira et al.

Notice of allowance in U.S. Appl. No. 17/504,283, dated Sep. 10, 2024.

Notice of allowance in U.S. Appl. No. 17/504,299, dated Sep. 10, 2024.

Notice of allowance in U.S. Appl. No. 17/856,895, dated Aug. 28, 2024.

Notice of allowance in U.S. Appl. No. 18/195,152, dated Aug. 30, 2024.

Notice of allowance in U.S. Appl. No. 18/224,508, dated Aug. 29, 2024.

Office Action in U.S. Appl. No. 18/405,077, dated Sep. 11, 2024.

Office Action, Advisory Action, in U.S. Appl. No. 17/504,260, dated Nov. 14, 2024.

Walmart.com; search, obtained from the Internet on Nov. 17, 2024; URL: https://www.walmart.com/search?q=for+Apple+MagSafe+Charger%2C+Wireless+Charger+with+Fast+Charging+Capability%2C+Type+C+Wall+Charger%2C+Compatible+for+iPhone+and+AirPods; 3 pages.

M-Con; obtained from the Internet on Nov. 17, 2024; URL: https://www.m-con.co/; 6 pages.

U.S. Appl. No. 18/813,384, filed Aug. 2024, Maker.

U.S. Appl. No. 18/915,580, filed Oct. 2024, Khaira et al.

U.S. Appl. No. 18/915,648, filed Oct. 2024, Khaira et al.

U.S. Appl. No. 18/942,103, filed Nov. 2024, Scott et al.

U.S. Appl. No. 18/945,830, filed Nov. 2024, Khaira et al.

U.S. Appl. No. 18/962,755, filed Nov. 2024, Khaira et al.

U.S. Appl. No. 18/967,940, filed Dec. 2024, Khaira et al.

Notice of allowance in U.S. Appl. No. 17/504,260, dated Dec. 9, 2024.

Notice of allowance in U.S. Appl. No. 18/405,077, dated Dec. 12, 2024.

Office Action in U.S. Appl. No. 18/076,172, dated Dec. 2, 2024.

International Search Report and Written Opinion of the International Searching Authority issued in International Application No. PCT/US2024/039193, mailed Nov. 11, 2024 (16 pages).

International Search Report and Written Opinion of the International Searching Authority issued in International Application No. PCT/US2024/039487, mailed Nov. 18, 2024 (20 pages).

International Search Report and Written Opinion of the International Searching Authority issued in International Application No. PCT/US2024/042461, mailed Nov. 12, 2024 (13 pages).

(56) References Cited

OTHER PUBLICATIONS

Anonymous: "Chamfer", Wikipedia, Nov. 14, 2022 (Nov. 14, 2022), pp. 1-5, XP093219692, Retrieved from the Internet: URL:https://en.wikipedia.org/w/index.php?title=Chamfer&oldid=1121832130 p. 3, 5 pages.
Anonymous: "Remote Play", Wikipedia, dated Jun. 30, 2023, XP093217737, Retrieved from the Internet: URL:https://en.wikipedia.org/w/index.php?title=Remote_Play&oldid=1162598770, 9 pages.
ROG Tessen Mobile Controller, Transform Your Game, Republic of Gamers, obtained from the Internet on Dec. 16, 2024, URL: https://rog.asus.com/controllers/rog-tessen-mobile-controller/, 7 pages.
U.S. Appl. No. 19/013,753, filed Jan. 2025, Khaira.
U.S. Appl. No. 63/743,503, filed Jan. 2025, Khaira.
Notice of allowance in U.S. Appl. No. 18/405,077, dated Dec. 26, 2024.
Notice of allowance in U.S. Appl. No. 18/405,077, dated Jan. 13, 2025.
Notice of allowance in U.S. Appl. No. 18/734,411 dated Jan. 13, 2025.
Office Action in U.S. Appl. No. 18/076,172, dated Jan. 10, 2025.
International Preliminary Report on Patentability in International Application No. PCT/US2023/031919, mailed Jan. 16, 2025.
Notice of allowance in U.S. Appl. No. 17/504,299, dated Apr. 15, 2024.
Notice of allowance in U.S. Appl. No. 18/076,146, dated Apr. 15, 2024.
Notice of allowance in U.S. Appl. No. 18/086,103, dated Mar. 25, 2024.
Notice of allowance in U.S. Appl. No. 18/086,103, dated Apr. 3, 2024.
Office Action in U.S. Appl. No. 17/504,260, dated Mar. 21, 2024.
Office Action in U.S. Appl. No. 17/504,299, dated Mar. 22, 2024.
Office Action in U.S. Appl. No. 18/195,152, dated Mar. 26, 2024.
International Search Report and Written Opinion of the International Searching Authority issued in International Application No. PCT/US2023/036567, mailed Mar. 11, 2024 (18 pages).
International Search Report and Written Opinion of the International Searching Authority issued in International Application No. PCT/US2023/081101, mailed Mar. 11, 2024 (19 pages).
Bluetooth Special Interest Group: "Bluetooth Human Interface Device (HID) Profile Specifications", Bluetooth Adopted Specification Web page, Feb. 21, 2012 (Feb. 21, 2012), pp. 1-123, XP055133797, Retrieved from the Internet: URL:https://www.bluetooth.org/en-us/specification/adopted-specifications [retrieved on Aug. 7, 2014].
U.S. Appl. No. 18/746,611, filed Jun. 2024, Ivan Torres.
U.S. Appl. No. 18/739,527, filed Jun. 2024, Hong Tai Wei.
Notice of allowance in U.S. Appl. No. 18/076,146, dated Jul. 22, 2024.
Notice of allowance in U.S. Appl. No. 18/086,103, dated Jul. 9, 2024.
Notice of allowance in U.S. Appl. No. 18/195,152, dated Jul. 23, 2024.
Notice of allowance in U.S. Appl. No. 18/224,508, dated Jun. 21, 2024.
Office Action in U.S. Appl. No. 17/504,260, dated Jul. 23, 2024.
International Search Report and Written Opinion of the International Searching Authority issued in International Application No. PCT/US2024/019901, mailed Jul. 17, 2024 (15 pages).
Anonymous: "Using the wireless controller", Playstation 4 User's Guide, Mar. 15, 2023 (Mar. 15, 2023), pp. 1-3, XP093178521, Retrieved from the Internet: URL:https://web.archive.org/web/20230315012624/https://manuals.playstation.net/document/en/ps4/basic/usercontroller.html [retrieved on Jun. 5, 2024] the whole document, 3 pages.
U.S. Appl. No. 17/866,166, filed Jul. 15, 2022 entitled "Game Controller for a Mobile Device with Flat Flex Connector."
U.S. Appl. No. 17/866,234, filed Jul. 15, 2022 entitled "Game Controller for a Mobile Device with Extended Bumper Button."
"Backbone One"; Mobile gaming hardware product page; Backbone; Dec. 9, 2022; 7 pages.
"Digital Depth: All Controller Universal & Fully Customizable"; Kickstarter project page for customizable game controller; Digital Depth Inc.; Aug. 4, 2021; 25 pages.
"PhoneJoy Play: Turn your phone into a console!"; Kickstarter project page for compact gamepad; PhoneJoy Solutions America, Inc.; Jul. 29, 2014; 42 pages.
"Picture-in-picture (PiP) support"; Android Developers UI Guide; downloaded from the Internet on Nov. 27, 2022 at https://developer.android.com/develop/ui/views/picture-in-picture; Nov. 11, 2022; 10 pages.
"AVPictureInPictureController: A controller that responds to user-initiated Picture in Picture playback of video in a floating, resizable window"; Apple Developer Documentation, AVKit; downloaded from the Internet on Nov. 27, 2022 at https://developer.apple.com/documentation/avkit/avpictureinpicturecontroller; Apple Inc.; 2022; 8 pages.
"GitHub—Kofktu/PIPKit: Picture in Picture for iOS"; downloaded from the Internet on Nov. 27, 2022 at https://github.com/Kofktu/PIPKit; GitHub, Inc.; 2022; 11 pages.
"Picture-in-Picture API—Web APIs / MDN"; downloaded from the Internet on Nov. 27, 2022 at https://developer.mozilla.org/en-US/docs/Web/API/Picture-in-Picture_API; Mozilla Corporation; Oct. 10, 2022; 4 pages.
"How to implement Picture in Picture Webview on IOS Swift?"; StackOverflow Questions; downloaded from the Internet on Nov. 28, 2022 at https://stackoverflow.com/questions/69565199/how-to-implement-picture-in-picture-webview-on-ios-swift; StackOverflow; Oct. 14, 2021; 2 pages.
Osterberg, J.; "Picture in Picture Across All Platforms"; Kodeco / iOS & Swift Tutorials; downloaded from the Internet on Nov. 28, 2022 at https://www.kodeco.com/24247382-picture-in-picture-across-all-platforms; Jul. 26, 2021; 14 pages.
"Displaying live data with Live Activities"; Apple Developer Documentation Activity Kit article; downloaded from the Internet on Nov. 28, 2022 at https://developer.apple.com/documentation/activitykit/displaying-live-data-with-live-activities; Apple Inc.; 2022; 37 pages.
"User Notifications: Push user-facing notifications to the user's device from a server, or generate them locally from your app"; Apple Developer Documentation; downloaded from the Internet on Nov. 28, 2022 at https://developer.apple.com/documentation/usernotifications; 2022; 16 pages.
"Gamepass App now supports Picture in Picture"; Reddit, xcloud comments; downloaded from the Internet on Nov. 28, 2022 at https://www.reddit.com/r/xcloud/comments/mvathi/gamepass_app_now_supports_picture_in_picture/; Reddit Inc.; 2022; 6 pages.
"Pip (picture in picture) mode on android with the xbox game pass beta app"; Reddit, XboxGamePass comments; downloaded from the Internet on Nov. 29, 2022 at https://www.reddit.com/r/XboxGamePass/comments/n7f5bk/pip_picture_in_picture_mode_on_android_with_the/; Reddit Inc.; 2022; 6 pages.
"Backbone—Next-Level Play"; Apple App Store preview; downloaded from the Internet on Nov. 29, 2022 at https://apps.apple.com/us/app/backbone-next-level-play/id1449660663; Apple Inc.; 2022; 4 pages.
Faulkner, C.; "The Backbone One is a stunning controller that turns your iPhone into a more capable gaming device"; The Verge, entertainment tech review webpage; downloaded from the Internet on Nov. 29, 2022 at https://www.theverge.com/21525741/backbone-one-iphone-ios-controller-gaming-portable-review; Vox Media LLC; Apr. 27, 2021; 12 pages.
Faulkner, C.; "Backbone's excellent phone controller is now shipping for Android" The Verge, entertainment tech review webpage; downloaded from the Internet on Nov. 29, 2022 at https://www.theverge.com/2022/11/16/23462127/backbone-one-phone-controller-android-usb-c-features; Vox Media LLC; Nov. 16, 2022.
Adler, M.; "Backbone One Review: Mobile gaming reenvisioned"; IGN review; downloaded from the Internet on Nov. 29, 2022 at https://www.ign.com/articles/backbone-one-review; IGN; Nov. 7, 2021; 18 pages.
Max Tech; Backbone One Review—The Best iPhone Gaming Controller!; YouTube product review video; downloaded from the

(56) References Cited

OTHER PUBLICATIONS

Internet on Nov. 29, 2022 at https://www.youtube.com/watch?v=zRJQjt2nzDo; YouTube; Jun. 2022; 4 pages.
"Game Center"; Apple Developer Game Center overview; downloaded from the Internet on Nov. 29, 2022 at https://developer.apple.com/game-center/; Apple Inc.; 2022; 4 pages.
Voorhees, J.; "Deeper Controller Support and a Revitalized Game Center: Exploring Apple's 2020 Gaming Updates"; MacStories Weekly Extras; downloaded from the Internet on Nov. 29, 2022 at https://www.macstories.net/stories/deeper-controller-support-and-a-revitalized-game-center-exploring-apples-2020-gaming-updates/; MacStories, Inc.; Aug. 27, 2020; 14 pages.
Schofield, T.; "Logitech G Cloud Unboxing and Hands On!"; YouTube product review video; downloaded from the Internet on Nov. 29, 2022 at https://www.youtube.com/watch?v=speoPL5vqX0; YouTube; Nov. 2022; 3 pages.
Tech & Design; "How to Set Up New Nintendo Switch | Beginners Guide | First Time Turning On"; YouTube product review video; downloaded from the Internet on Nov. 29, 2022 at https://www.youtube.com/watch?v=XtMcQ9IAkCc; YouTube; 2021; 4 pages.
Box.co.uk; "How Does the Samsung Gaming Hub Work?"; YouTube product tutorial; downloaded from the Internet on Nov. 29, 2022 at https://www.youtube.com/watch?v=uAT4tZR3mNk; YouTube; Oct. 2022; 5 pages.
Office Action in U.S. Appl. No. 17/856,895, dated Mar. 12, 2024.
International Search Report and Written Opinion of the International Searching Authority issued in International Application No. PCT/US2023/036609, mailed Feb. 12, 2024 (15 pages).
International Search Report and Written Opinion of the International Searching Authority issued in International Application No. PCT/US2023/079518, mailed Feb. 9, 2024 (12 pages).
Notice of allowance in U.S. Appl. No. 17/856,895, dated Apr. 16, 2024.
Office Action in U.S. Appl. No. 18/405,077, dated May 7, 2024.
International Search Report and Written Opinion of the International Searching Authority issued in International Application No. PCT/US2024/010404, mailed Apr. 24, 2024 (16 pages).
Notice of allowance in U.S. Appl. No. 17/504,283, dated May 29, 2024.
Notice of allowance in U.S. Appl. No. 17/504,299, dated Jun. 12, 2024.
Notice of allowance in U.S. Appl. No. 17/856,895, dated Jun. 12, 2024.
Notice of allowance in U.S. Appl. No. 18/076,146, dated Jun. 13, 2024.
Notice of allowance in U.S. Appl. No. 18/086,103, dated May 28, 2024.
International Search Report and Written Opinion of the International Searching Authority issued in International Application No. PCT/US2023/079521, mailed May 24, 2024 (15 pages).
U.S. Appl. No. 63/770,124, filed Mar. 2025, Khaira.
U.S. Appl. No. 63/781,523, filed Apr. 2025, Khaira.
Office Action in U.S. Appl. No. 18/086,077, dated Mar. 14, 2025.
Office Action in U.S. Appl. No. 18/136,509, dated Apr. 1, 2025.
Jovanee, Alice, The new 8Bitdo Ultimate controller comes in October, https://www.theverge.com/2022/8/30/23326887/8bitdo-ulti mate-pro-control ler-bluetooth-preorder-nintendo-switch-wireless, Aug. 30, 2022 (Year: 2022), 3 pages.
Lon.tv, GameSir X2 USB-C Android Game Controller Review (Newest Version), https://www.youtube.com/watch?v=9Kzytm8D6qk, Nov. 24, 2021 (Year: 2021), 8 pages.
U.S. Appl. No. 16/693,080, filed Nov. 2019, O'Connor.
U.S. Appl. No. 16/808,339, filed Mar. 2020, Khaira et al.
U.S. Appl. No. 17/504,260, filed Oct. 2021, Khaira.
U.S. Appl. No. 17/504,283, filed Oct. 2021, Khaira et al.
U.S. Appl. No. 17/504,299, filed Oct. 2021, Khaira.
U.S. Appl. No. 17/850,912, filed Jul. 2022, Khaira.
U.S. Appl. No. 17/856,895, filed Jul. 2022, Khaira.
U.S. Appl. No. 17/987,772, filed Nov. 2022, Sorensen.
U.S. Appl. No. 18/086,077, filed Dec. 2022, Maker.
U.S. Appl. No. 18/086,103, filed Dec. 2022, Maker.
U.S. Appl. No. 18/138,377, filed Apr. 2023, Sorensen et al.
U.S. Appl. No. 18/195,152, filed May 2023, Khaira.
U.S. Appl. No. 18/224,508, filed Jul. 2023, Maker.
U.S. Appl. No. 18/237,680, filed Aug. 2023, O'Connor.
U.S. Appl. No. 18/237,698, filed Aug. 2023, O'Connor.
U.S. Appl. No. 18/242,672, filed Sep. 2023, Aldridge et al.
U.S. Appl. No. 18/369,000, filed Sep. 2023, Koch et al.
U.S. Appl. No. 18/369,025, filed Sep. 2023, Koch et al.
U.S. Appl. No. 18/388,631, filed Nov. 2023, Khaira et al.
U.S. Appl. No. 18/388,636, filed Nov. 2023, Khaira et al.
U.S. Appl. No. 18/388,922, filed Nov. 2023, O'Connor et al.
U.S. Appl. No. 18/389,063, filed Nov. 2023, Maker et al.
U.S. Appl. No. 18/405,077, filed Jan. 2024, Lake et al.
U.S. Appl. No. 63/422,797, filed Nov. 2022, Khaira et al.
U.S. Appl. No. 63/425,655, filed Nov. 2022, Maker et al.
U.S. Appl. No. 63/435,089, filed Dec. 2022, O'Connor.
U.S. Appl. No. 63/437,580, filed Jan. 2023, Lake et al.
U.S. Appl. No. 63/452,551, filed Mar. 2023, Aldridge et al.
U.S. Appl. No. 63/524,014, filed Jun. 2023, O'Connor.
U.S. Appl. No. 63/530,230, filed Aug. 2023, Khaira et al.
U.S. Appl. No. 63/533,580, filed Aug. 2023, Khaira et al.
Office Action in CN Application No. 202180019131.2, dated Jul. 27, 2023.
Office Action in CN Application No. 202180019131.2, dated Mar. 28, 2023.
Office Action—Communication pursuant to Rules 161(1) and 162 EPC, dated Oct. 26, 2022.
Notice of allowance in U.S. Appl. No. 18/224,508, dated Jan. 24, 2024.
Office Action in U.S. Appl. No. 16/693,080, dated Jan. 25, 2021.
Office Action in U.S. Appl. No. 16/693,080, dated Jun. 8, 2021.
Office Action in U.S. Appl. No. 17/504,283, dated Feb. 13, 2024.
Office Action in U.S. Appl. No. 17/856,895, dated Jul. 18, 2023.
Office Action in U.S. Appl. No. 17/856,895, dated Nov. 1, 2023.
Office Action in U.S. Appl. No. 17/856,895, dated Oct. 27, 2022.
Office Action in U.S. Appl. No. 18/076,146, dated Dec. 12, 2023.
Office Action in U.S. Appl. No. 18/086,077, dated Apr. 17, 2023.
Office Action in U.S. Appl. No. 18/086,077, dated Aug. 17, 2023.
Office Action in U.S. Appl. No. 18/086,103, dated Dec. 7, 2023.
Office Action in U.S. Appl. No. 18/195,152, dated Aug. 4, 2023.
Office Action in U.S. Appl. No. 18/224,508, dated Oct. 3, 2023.
International Search Report and Written Opinion of the International Searching Authority issued in International Application No. PCT/US2023/031919, mailed Nov. 17, 2023 (14 pages).
International Search Report and Written Opinion of the International Searching Authority, issued in International Application No. PCT/US2020/061291, mailed Feb. 24, 2021, 20 pages.
Dickinson, "Instant Replay: Building a Game Engine with Reproducible Behavior," Jul. 13, 2001, Retrieved from the Internet: URL: http://www.gamasutra.com/features/20010713/dickinson_01.htm [retrieved on Oct. 2, 2007], 6 pages.
Vinyals et al., "Grandmaster level in StarCraft II using multi-agent reinforcement learning," Nature, Macmillan Journals Ltd., London, vol. 575, No. 7782, Oct. 30, 2019, pp. 350-354, 22 pages.
Wagner, "Developing Your Own Replay System," Feb. 4, 2004, Retrieved from the Internet: URL: http://www.Jamasutra.com/features/20040204/wagner_01.shtml [retrieved on Oct. 9, 2007], 11 pages.
U.S. Appl. No. 18/076,121, filed Dec. 6, 2022 entitled "Contextually-Aware Platform Service Switcher."
U.S. Appl. No. 18/076,146, filed Dec. 6, 2022 entitled "System and Method for Automatic Content Capability Detection."
U.S. Appl. No. 18/076,172, filed Dec. 6, 2022 entitled "System and Method for Rich Content Browsing Multitasking on Device Operating Systems with Multitasking Limitations."
U.S. Appl. No. 18/214,917, filed Jun. 27, 2023 entitled "Game Controller with Play-on-Any-Screen Feature."
U.S. Appl. No. 18/214,949, filed Jun. 27, 2023 entitled "Software-Enabled Mobile Game Controller with Integrated Platform Operating Service."
U.S. Appl. No. 18/202,755, filed May 26, 2023 entitled "Cloud Game Queueing."

(56) References Cited

OTHER PUBLICATIONS

U.S. Appl. No. 18/226,883, filed Jul. 27, 2023 entitled "Platform-Customized Mobile Game Controller and Methods for Use Therewith."

U.S. Appl. No. 18/226,892, filed Jul. 27, 2023 entitled "Mobile Game Controller and Method for Connecting to a Wireless Audio Device."

"Why queue in geforce now so long? I try to answer for this question" Reddit, GeForceNOW comments; downloaded from the Internet on Jun. 7, 2023 at why_queue_in_geforce_now_so_long?_I_try_to_answer_for_this_question_:_r/GeForceNOW_(reddit.com); Reddit Inc.; Jun. 1, 2023; 6 pages.

Hinton, L.; "Xbox Cloud Gaming 'Lots of people are playing' Fix: Why is queue taking so long? and How to fix Xbox Cloud Gaming 'Lots of people are playing' error"; downloaded from the Internet on Jun. 7, 2023 at Xbox_Cloud_Gaming_'Lots_of_people_are_playing'_Fix:_Why_is_queue_taking_so_long?—GameRevolution; Game Revolution; Dec. 13, 2021; 6 pages.

Sholtz, M.; "The Razer Kishi V2 offers a new Virtual Controller mode, and it's pretty slick"; Android Police Newsletter article; downloaded from the Internet on Aug. 16, 2023 at The_Razer_Kishi_V2_offers_a_new_Virtual_Controller_mode,_and_it's_pretty_slick_(androidpolice.com); Jan. 21, 2023; 7 pages.

"Rayz Pro"; Pioneer Rayz™ Pro earbuds product page; downloaded from the Internet on Aug. 16, 2023 at Rayz_Pro_Earphone—Pioneer_Rayz; Pioneer Rayz; 2023; 9 pages.

International Search Report and Written Opinion of the International Searching Authority issued in International Application No. PCT/US2021/019941, mailed Jun. 9, 2021 (11 pages).

\* cited by examiner

FIG. 10

```
UsagePage(GenericDesktop)
Usage(GenericDesktop,Gamepad)
Collection(Application)
    Usage(GenericDesktop,Gamepad)
    Collection(Logical)
        Logical(-127, 127)
        Physical(-127, 127)
        Usage(GenericDesktop, Pointer)
        Collection(Physical)
            ReportSize(8)
            ReportCount(4)
            Usage(GenericDesktop, X)
            Usage(GenericDesktop, Y)
            Usage(GenericDesktop, Z)
            Usage(GenericDesktop, Rz)
            Input(data,var, abs)
        EndCollection ReportCount(2)
        Logical(0, 255)
        Physical(0, 255)
        UsagePage(Button)
        Usage(Button, Button7)
        Usage(Button, Button8)
        Input(data,var, abs)
        ...
    EndCollection
EndCollection
```

Primary System Architecture

Secondary System Architecture

UNIVERSAL MOBILE GAME CONTROLLER

CROSS-REFERENCE TO RELATED APPLICATION

This application claims the benefit of U.S. Provisional Patent Application No. 63/435,089, filed Dec. 23, 2022, which is hereby incorporated by reference.

BACKGROUND

A controller can be used with a computing device to select and/or interact with content using user input devices on the controller. The content can be locally-stored on the computing device and/or streamed from a remote device. For example, the controller can be a game controller used to play a game that is native to the computing device and/or to play a game that is streamed from a remote server to a browser of the computing device.

BRIEF DESCRIPTION OF THE DRAWINGS

FIG. 10 is an illustration of an HID report descriptor of an embodiment.

DETAILED DESCRIPTION

Introduction

The following embodiments describe a system architecture and implementation that allow a controller (in one implementation, a mobile game controller) to interoperate with multiple computing device operating systems (e.g., Android and iOS, although other operating systems can be used) in an automatic way through a common connector (e.g., USB-C, although other common connectors can be used). In addition, these embodiments can enable communication to an application running within the computing device operating system. Without these embodiments, it might be necessary to have a separate embedded system to support each of the major computing device operating systems. Typically, this is done through unique product SKUs that are specifically designed for each ecosystem. Even if a single hardware solution were developed, there would still be a significant product usability issue; without a way to automatically detect what kind of computing device was attached, the product would require manual user intervention to configure the game controller. With these embodiments, a fully automatic USB-C game controller that supports Android and iOS (examples of computing device operating systems, but others can be used) can be provided. That is, instead of building separate products for iOS and Android, for example, with these embodiments, a single version can support both, which is more efficient in various facets of product development and is more intuitive to customers because there is no ambiguity in identifying which version is needed.

Before turning to a description of example implementations of a universal game controller, the following section provides an overview of an exemplary computing environment. It should be understood that these are merely examples and other implementations can be used. Accordingly, none of the details presented herein should be read into the claims unless expressly recited therein.

Overview of an Exemplary Computing Environment

Figure 1:
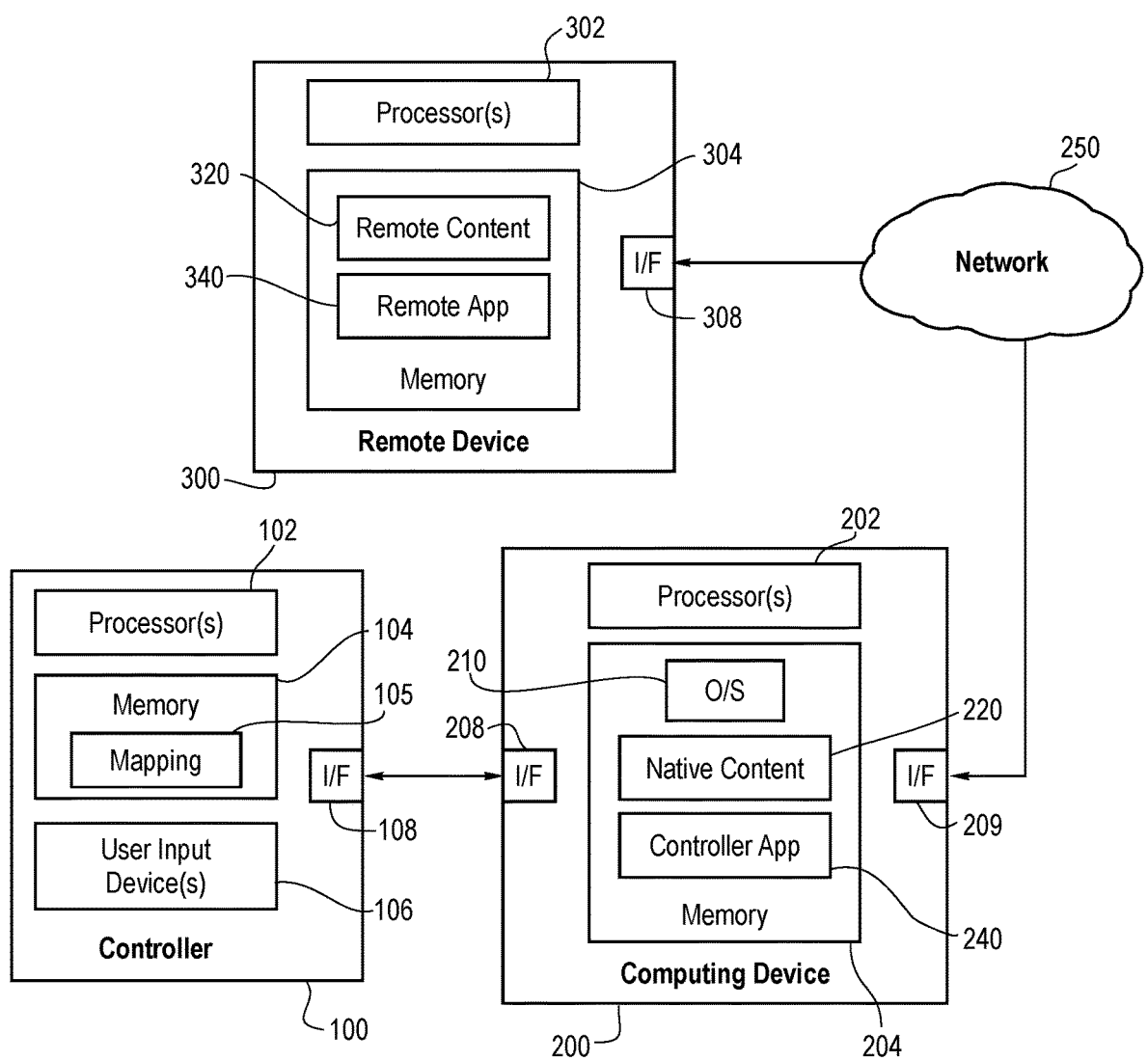
FIG. 1 is a block diagram of a computing environment of an embodiment.

Turning now to the drawings, FIG. 1 is an illustration of a computing environment of an embodiment. As shown in FIG. 1, this environment comprises a user controller 100, a computing device 200, and a remote device 300. The user controller 100 and computing device 200 are in communication with each other via respective wired or wireless interfaces 108, 208. Likewise, the computing device 200 and the remote device 300 are in communication with each other via wired or wireless interfaces 209, 308. As used herein, "in communication with" can mean in direct communication with or in indirect communication with via one or more components, which may or may not be mentioned herein. For example, in the embodiment shown in FIG. 1, the computing device 200 and the remote device 300 are in communication with each other via a network 250 (e.g., the Internet, a local area network, a peer-to-peer wireless mesh, etc.). However, in other embodiments, the computing device 200 and the remote device 300 can communicate with each other in the absence of a network. Also, as used herein, the remote device 300 is "remote" in the sense that it is physically separate from the computing device 200 in some fashion. In many implementations, the physical distance is relatively great, such as when the remote device 300 is located in another town, state, or country. In other implementations, the physical distance may be relatively short, such as when the remote device 300 is in the same room or building as the computing device 200. Also, the term "remote device" can refer to a single remote device or multiple remote devices.

As shown in FIG. 1, in this embodiment, the controller 100 comprises one or more processors 102, a memory 104, and one or more user input devices 106. The user input devices 106 can take any suitable form, such as, but not limited to, a button, a joystick, a switch, a knob, a touch-sensitive screen/pad, a microphone for audio input (e.g., to capture a voice command or sound), a camera for video input (e.g., to capture a hand or facial gesture), etc. To be clear, as used herein a "user input device" refers to a control surface and not to the entire system or parent device on which user input devices are placed.

Generally speaking, the controller 100 can be used by a user in the selection and (passive or active) consumption of content (e.g., playing a game, watching a video, listing to audio, reading text, navigating a displayed user interface, etc.) presented using the computing device 200 in some fashion. The controller 100 may be referred to based on the content with which it is being used. For example, the controller 100 can be referred to as a game controller when it is being used to play a game. And if the controller 100 is being used to play a game on a mobile device, such as a phone or tablet (as opposed to a relatively-stationary game console), the controller 100 can be referred to as a mobile game controller. However, the same controller 100 may also be used to control the playback of non-game content, such as video or audio. Accordingly, a specific use should not be read into the term "controller" unless expressly stated.

The computing device 200 can also take any suitable form, such as, but not limited to, a mobile device (e.g., a phone, tablet, laptop, watch, eyewear, headset, etc.) or a relatively more-stationary device (e.g., a desktop computer, a set-top box, a gaming console, etc.). In the embodiment shown in FIG. 1, the computing device 200 comprises one or more processors 202 and a memory 204. In this particular embodiment, the memory 204 stores computer-readable program code for an operating system (O/S) 210 (e.g., iOS or Android), native content 220, and an application configured for use with the controller 100 ("controller app") 240. This application 240 will sometimes be referred to herein as the client platform operating service or system. Exemplary functions of this application 240 will be described herein. Also, as used herein, "native content" refers to content that is at least partially stored in the computing device 200. For example, native content can be wholly stored on the computing device; or native content can be stored partially on the computing device 20 and partially on one or more remote devices 300 or some other device or set of devices.

The remote device 300 also comprises one or more processors 302 and memory units 304 storing remote content 320 and an application ("app") 340 (which is sometimes referred to herein as the remote platform operating service or system) that can be used to communicate with the controller app 240 or another entity on the computing device 200.

It should be understood that more or fewer components than what are shown in FIG. 1 can be used. For example, the computing device 200 can have one or more user input device(s) (e.g., a touchscreen, buttons, switches, etc.), as well as a display (e.g., integrated with a touchscreen). Further, while the components in the controller 100, computing device 200, and remote device 300 are all shown in respective single boxes in FIG. 1, implying integration in respective single devices, it should be understood that the components can be located in multiple devices. For example, the processor 302 and memory 304 in the remote device 300 can be distributed over multiple devices, such as when the processor 302 is a server and the memory 304 is a remote storage unit. As used, the remote device 300 can also refer to multiple remote devices that are in communication with the computing device 200. Other variations for any of the devices 100, 200, 300 are possible.

Finally, the memory 104, 204, 304 in these various devices 100, 200, 300 can take any suitable form and will sometimes be referred to herein as a non-transitory computer-readable storage medium. The memory can store computer-readable program code having instructions that, when executed by one or more processors, cause the one or more processors to perform certain functions.

Figure 2:
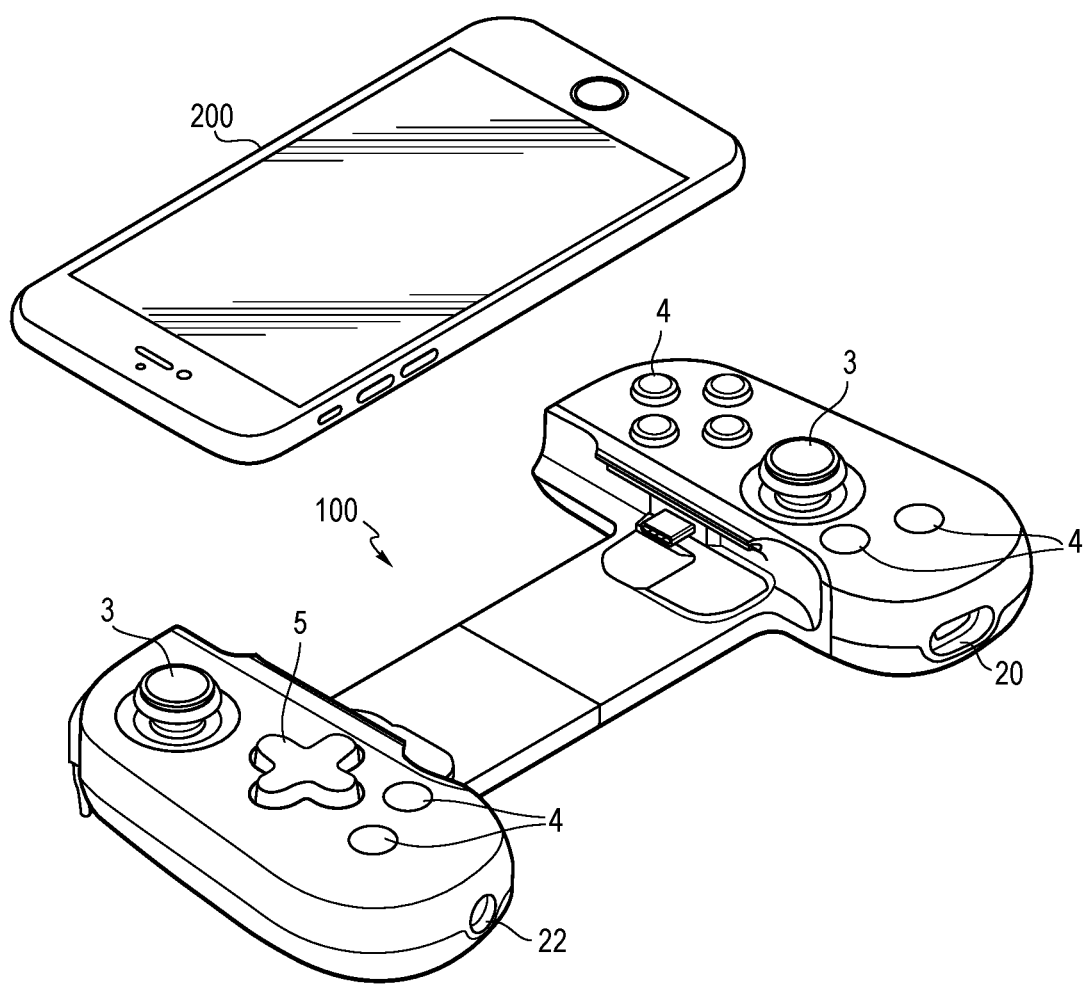
FIG. 2 is an illustration of a controller and computing device of an embodiment.
Figure 3:
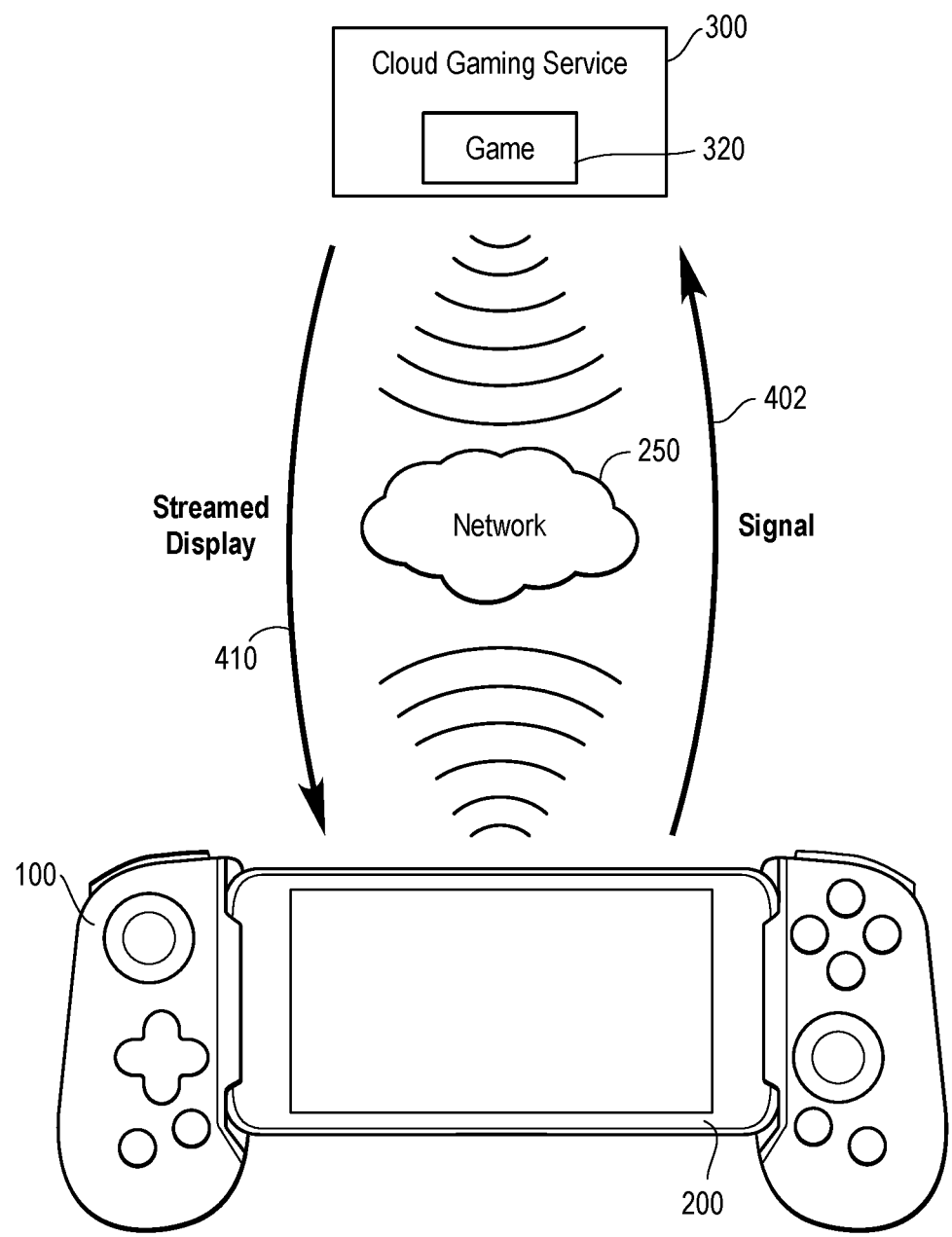
FIG. 3 is a block diagram of a computing environment of an embodiment.

As mentioned above, the controller 100, computing device 200, and remote device 300 can take any suitable form. For purposes of describing one particular implementation of an embodiment, the controller 100 in this example takes the form of a handheld game controller, the computing device 200 takes the form of a mobile phone or tablet, and the remote device 300 takes the form of a cloud gaming system. This example is shown in FIGS. 2 and 3. Again, this is just one example, and other implementations can be used. Further, as mentioned above, a game is just one example of content that can be consumed, and the controller 100 can be used with other types of content (e.g., video, audio, text). So, the details presented herein should not be read into the claims unless expressly recited therein.

Turning first to FIG. 2, FIG. 2 shows an example handheld game controller 100 and mobile phone 200 of an embodiment. This game controller 100 has a number of user input devices, such as joysticks 3, buttons 4, and toggle switches 5. In this example, the game controller 100 takes the form of a retractable device, which, when in an extended position, is able to accept the mobile phone 200. A male communication plug on the controller 100 mates with a female communication port on the computing device 200 to place the controller 100 and computing device 200 in communication with one another. The controller 100 in this embodiment also has a pass-through charging port 20 that allows the computing device 200 to have its battery charged and a headphone jack 22. In other embodiments, the controller 100 can connect to the computing device 200 through other means such as pairing wirelessly to the phone 200. Again, this is just an example, and other types of controllers can be used, such as those that do not fit around a mobile device.

As shown in FIG. 3, in this embodiment, the controller 100 can be used to play a game that is locally stored on the computing device 200 (a "native game" 220) or a game 320 that is playable via a network 250 on a cloud gaming service 300. In this example embodiment, remote gameplay, based on input from the game controller 100, the computing device 200 sends signals 402 to the cloud gaming service 300 and receives display data 410 back. In one embodiment, a browser on the computing device 200 is used to send and receive the signals 402, 410 to stream the game 320 to the user. There can be multiple variants of remote game play. One embodiment includes a host device, such a game console, PC, or other computing device not actively being controlled that can be streamed to the active computing device, such as a smartphone. from a host device (e.g., game console or PC) that a user can access remotely via their smartphone) and Another embodiment includes a cloud gaming service (which can be streamed from a data center), such as Xbox Game Pass, Amazon Luna, or other service, that can be streamed to the active computing device.

In one embodiment, the controller app 240 can facilitate the selection of a game (or other content). For example, the controller app 240 can display a user interface (e.g., on a display of the computing device 200 or on another display). The controller app 240 can also receive user input from the controller 100 to navigate and engage with content, for example, browse for, select, and launch a game from a displayed list of games. In this example, once the game is launched, input from the game controller 100 can be provided directly to the game or indirectly to the game through the controller app 240. As will be discussed in more detail below, the controller app 240 can enhance the standard experience offered on a computing device by extending functionality and providing enhanced interface capabilities in addition to the inherent interface of the computing device itself. For example, in some embodiments, the controller app 240 assigns a function to one or more of the user input devices on the controller 100 based on the particular content being consumed.

Example Implementations of a Universal Game Controller

Hardware

In one embodiment, the system comprises a USB host and a USB device. The USB host is typically a computing device of some kind, such as a mobile phone, tablet, or PC. The USB device in this case refers to a controller (in one embodiment, a mobile game controller). USB hosts have a downstream connection to the device and the USB device has an upstream connection to the host.

In one embodiment, the USB device supports at a minimum USB 1.1 full speed transmission characteristics. Due to the backwards compatible nature of newer USB versions, a USB 2.0 connection or even a 3.x connection is capable of enabling the type of USB communication can be used.

Communication

The USB communication protocol of an embodiment is summarized below. Each USB transmission can be described by a series of packets, where there is first a token packet, followed by an optional data packet, and completed with a status packet. The communication is driven by the USB host, and certain packet stages allow for data to flow upstream, such as when the host wants to read data from the device.

Packet Fields

In one embodiment, every USB packet consists of the following fields:
Sync (For receiver clock synchronization)
PID (Packet ID, used to identify packet type)
EOP (End of Packet)
With conditional fields depending on the packet type:
ADDR (Device Address)
ENDP (Endpoint Number)
CRC (Cyclic Redundancy Check)
Data
Frame Number Packet Types
Token Packet: Either IN, OUT, or SETUP packet which informs the USB device of the type of exchange that the host wants.

| Sync | PID | ADDR | ENDP | CRC | EOP |
|------|-----|------|------|-----|-----|

Data Packet: One of four data transmission types: DATA0, DATA1, DATA2, MDATA

| Sync | PID | Data | CRC | EOP |
|------|-----|------|-----|-----|

Handshake Packet
One of three packet IDs: ACK, NAK, STALL

| Sync | PID | EOP |
|------|-----|-----|

Start of Frame Packet

| Sync | PID | Frame Number | CRC | EOP |
|------|-----|--------------|-----|-----|

Endpoints

USB endpoints are used in the USB protocol to differentiate different sources of data exchanged on the bus and are essentially the point where the low-level protocol ends and the high-level USB functions begin. Endpoints are given a number 0-15, with zero being a required (implied) control endpoint for the protocol. At the device level, an endpoint is a chunk or allocation of USB buffer memory where the data is read or written to by USB transmissions.

When the host communicates with a device at the functional level, it is communicating through an endpoint. Endpoints can be further grouped into logical interfaces, which provide a greater level of abstraction to describe their function.

The control endpoint is used in conjunction with standardized requests to exchange information about the USB device, which ultimately informs the host about the remaining endpoints and their intended function. The description of the USB device is organized into objects referred to as descriptors, which exist as a hierarchy. In addition, endpoints can be one of four types which define their transfer characteristics:
Control (Command and status operations)
Isochronous (Continuous periodic transfers)
Bulk (Large burst transfers)
Interrupt (Small device initiated transfers)
Descriptors In USB, the USB device provides several descriptors to the host which encode various characteristics of the device. These descriptors are organized into a hierarchy, with the device descriptor at the top, followed by one or more configuration descriptors, and each configuration descriptor containing one or more interface descriptors. Interfaces can include zero or more endpoint descriptors, with the zero case being typically used to describe an idle interface (where certain endpoints can be deactivated).

Figure 4:
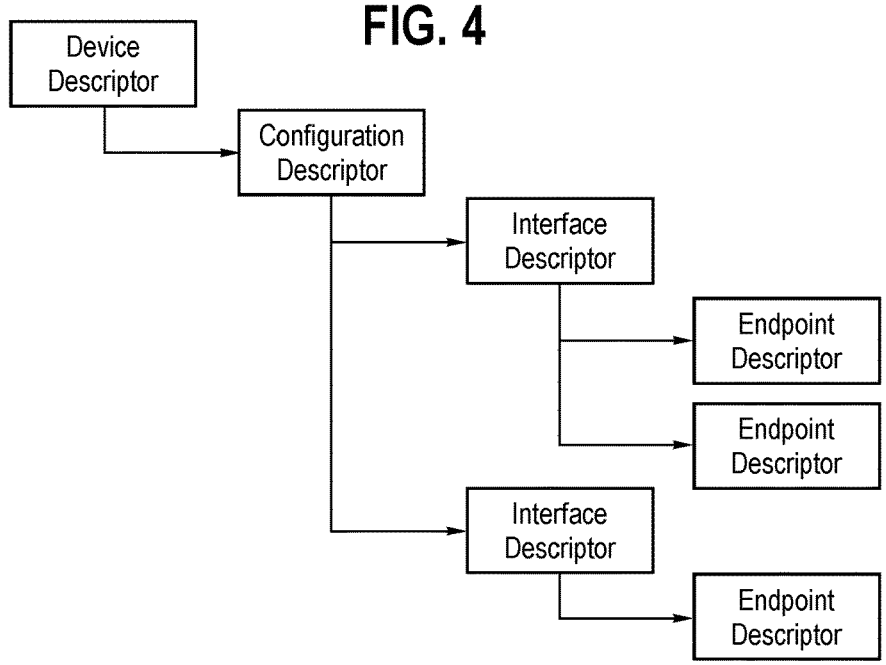
FIG. 4 is an illustration of a descriptor layout of an embodiment.

FIG. 4 is a descriptor layout of an embodiment.

Device Descriptor

The device descriptor contains the basic information about the USB device. In addition to containing various device identifiers, it defines key characteristic information that determines the USB version, control max packet size, and class of device which is required to continue further communication on the control endpoint. One other key field on the device descriptor is the number of configurations, which informs the host how many configuration descriptors follow (most devices use just one).

Figure 5:
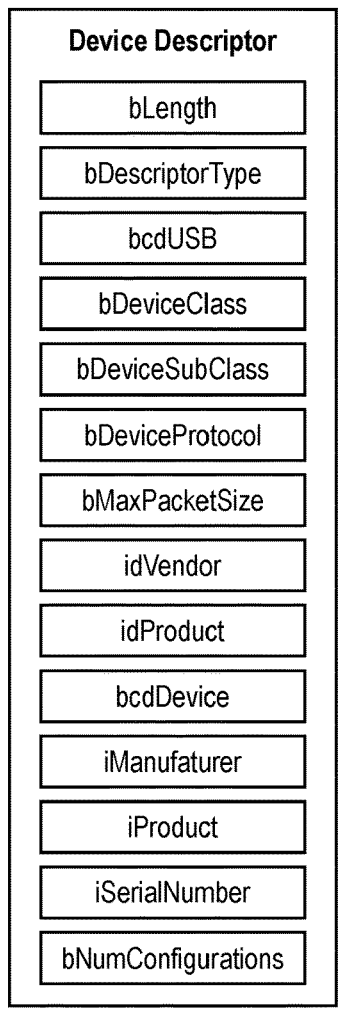
FIG. 5 is an illustration of a device descriptor of an embodiment.

FIG. 5 is a device descriptor layout of an embodiment.

Configuration Descriptor

The configuration descriptor contains all of the remaining information about the USB device and its interfaces and endpoints. In the header of the descriptor, the number of interfaces are specified, which informs the host of how many interfaces follow. The configuration descriptor also defines power related attributes, and a USB host may interrogate multiple configurations before deciding which to use (usually using power attributes as the criteria).

Figure 6:
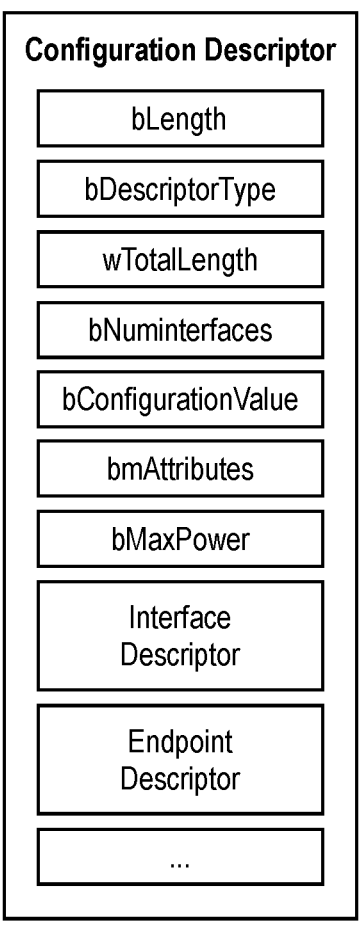
FIG. 6 is an illustration of a configuration descriptor of an embodiment.

FIG. 6 is a configuration descriptor layout of an embodiment.

Interface Descriptor

The interface descriptor is essentially a grouping of endpoints that relate to the same function or feature. In addition to the number of endpoint descriptors to follow, the interface descriptor defines the interface class, subclass, and protocol which further inform the host of the interface's function.

Typical interface classes: HID, Audio, Vendor

Figure 7:
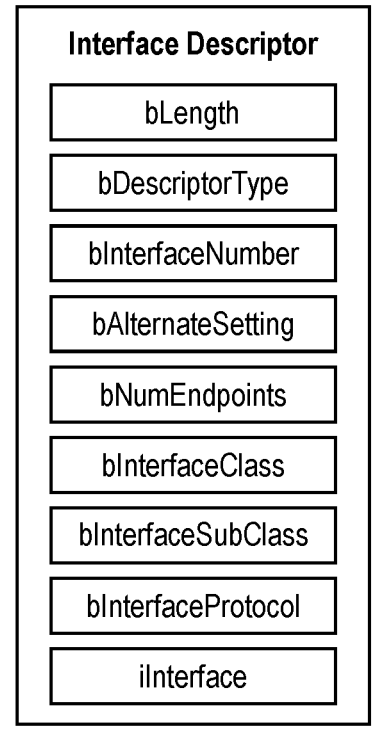
FIG. 7 is an illustration of an interface descriptor of an embodiment.

FIG. 7 is an interface descriptor layout of an embodiment.

Endpoint Descriptor

The endpoint descriptor associates the transfer attributes (direction, type, packet size, interval) for an endpoint number. The host uses this information for determining bandwidth requirements on the bus.

Figure 8:
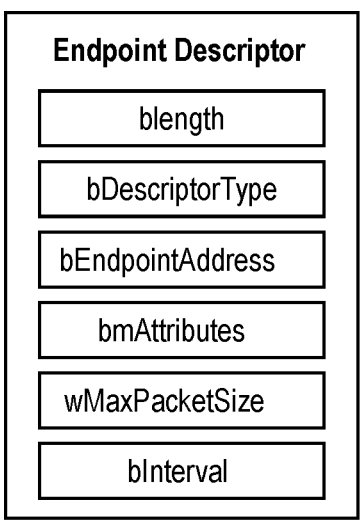
FIG. 8 is an illustration of an endpoint descriptor of an embodiment.

FIG. 8 is an endpoint descriptor layout of an embodiment.

String Descriptor

Each string on the device is stored in its own descriptor, and referenced in various other descriptors via an index. Generally, the strings do not change the function of the device and are primarily used for display purposes.

HID Descriptor

When implementing a human interface device (HID), this descriptor informs the host of which HID version is being used and how many associated descriptors are present. For example, if the descriptor type is specified as "report", the descriptor count is the number of HID report descriptors implemented.

Figure 9:
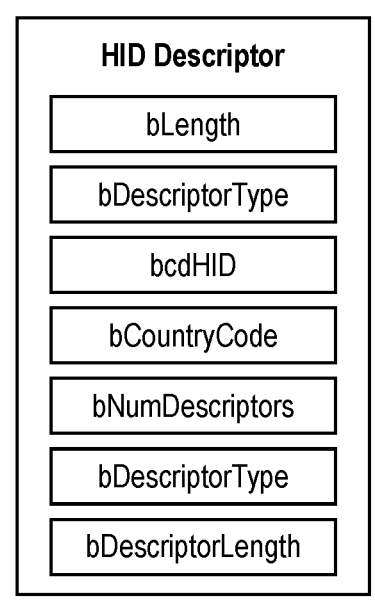
FIG. 9 is an illustration of a human interface device (HID) descriptor of an embodiment.

FIG. 9 is an HID descriptor layout of an embodiment.

HID Report Descriptor

A special descriptor used with the HID interface class/descriptor to encode the HID device and its report details. In this context, a report is essentially a packet of bytes that are exchanged with the host, usually via an interrupt endpoint. The HID descriptor can potentially reference multiple report descriptors, but it is up to the host to decide how to handle multiple HID devices.

FIG. 10 is an HID report descriptor layout of an embodiment.

USB Requests

Standard Requests

The eight standard USB requests begin with a setup packet (token packet with the PID of setup), and are followed by a data packet in situations where data is returned, such as on a get operation.

Get Status
Clear Feature
Set Feature
Set Address
Get Descriptor
Set Descriptor
Get Configuration
Set Configuration In addition, there are a few standard interface requests which are requests that reference specific USB interfaces from the USB descriptor:

Get Status
Clear Feature
Set Feature
Get Interface
Set Interface

USB Enumeration

At a high level, all USB hosts follow a similar sequence to identify a USB device through control transfers, at least at first. The sequence of requests to read out the descriptors of a USB device is often referred to as the USB device enumeration.

A typical enumeration flow can be summarized as follows:

1. Set Address
2. Get Device Descriptor
3. Get Configuration Descriptor
4. (Optional) Get String Descriptors
5. SetConfiguration
6. (Optional) Get HID Report Descriptors
7. SetInterface Once the address is set, the first part of the USB enumeration process is to get the device descriptor. The host will then use the bNumConfigurations field to determine how many configuration descriptors to read. Upon reading the configuration descriptor, the host will decide whether the configuration is supported and allocate resources for the supported interfaces. Next, the host will usually read out the various product strings as this typically needs to be displayed to the user. Assuming the configuration is deemed acceptable, the host will issue a SetConfiguration call to inform the device which configuration it would like to use. Finally, the host does another pass of reading secondary descriptors such as HID report descriptors, strings, and finally sets idle or active interfaces.

Unauthenticated Game Controller

For USB hosts, such as those running Android OS, that do not implement custom protocols such as authentication, the game controller device can configure a subset of its USB descriptors in a standard way such that the USB host can easily identify the game controller without custom protocols. Usually, this can be achieved by simply making the standard configuration appear first, as most hosts just pick the first interface it encounters. For example, if the standard HID interface that describes the HID game controller appears first, the unauthenticated device procedure will select that first interface, ignoring any subsequent HID interfaces that appear later in the USB configuration. Although additional HID interfaces are ignored by the operating system, these interfaces could still be used by a mobile application, for example to support additional custom buttons.

Standard USB host behavior does not necessarily mean it cannot support custom protocols. Outside of the HID game controller, a USB host can also provide an API to interact with vendor interfaces. For example, an application running on a USB host can use an API to establish bulk data communication with the mobile game controller via connecting to a vendor interface. Using the API, the application can select the appropriate vendor interface (by filtering the protocol identifier), while ignoring any other vendor interfaces that are not intended for use on this platform. One example of a vendor interface could include two bulk endpoints for IN and OUT communication which would be the primary data pipe for the app and game controller to exchange vendor messages. Another example would be an interrupt endpoint declared in a vendor interface, used to transmit asynchronous messages to the app such as custom button presses.

Figure 11:
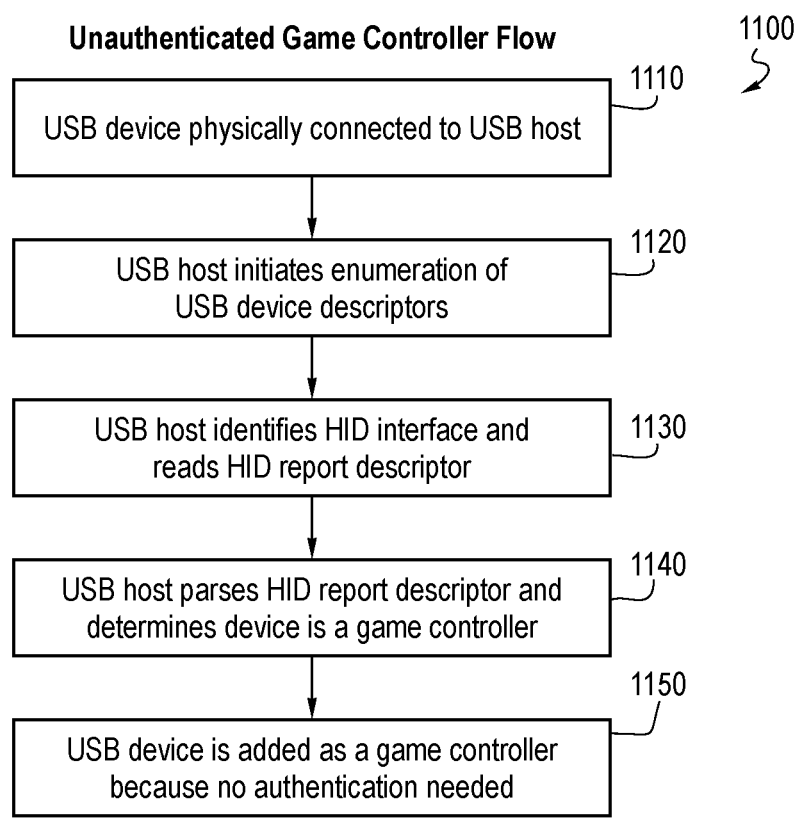
FIG. 11 is a flow chart of an unauthenticated game controller flow of an embodiment.

FIG. 11 is a flow chart 1100 of an unauthenticated game controller flow of an embodiment. As shown in FIG. 11, the USB device is physically connected to the USB host (act 1110). Then, the USB host initiates enumeration of USB device descriptors (act 1120). Next, the USB host identifies the HID interface and reads the HID report descriptor (act 1130). The USB host then parses the HID report descriptor and determines that the device is a game controller (act 1140). Finally, the USB device is added as a game controller because no authentication is needed (act 1150).

Authenticated Game Controller

For USB hosts that support a custom protocol for identification or authentication of accessory devices, such as hosts that run iOS, specific vendor interfaces can be used to implement the protocol. In certain embodiments, the USB host checks each vendor interface on the USB device, looking for a specific protocol identifier. When found, the host can inspect the associated endpoints, looking for a compatible combination, for example the existence of a pair bulk data endpoints (IN and OUT) which would be required for bi-directional communication. Bulk endpoints are commonly used due to their flexibility in packet sizes and bandwidth efficiency. If the host is satisfied with the USB configuration, it can enable the interface which in turn lets the device (mobile game controller) initiate communication for the custom protocol.

As part of the custom protocol, the mobile game controller will identify itself as a HID device and provide the specific HID report descriptors to the host. In some embodiments, the HID report descriptor is communicated directly through the protocol, and any subsequent HID input reports are transmitted via said protocol.

However, in other embodiments, the HID report descriptor is referenced from the standard USB device configuration. In this case, the device communicates the interface number in the device configuration in which to locate the HID descriptor, via the custom protocol. The USB host then knows which HID interface to use. In the context of universality, the custom HID interface should not be the first to appear in the configuration, such that standard host setups can be simultaneously allowed.

Figure 12:
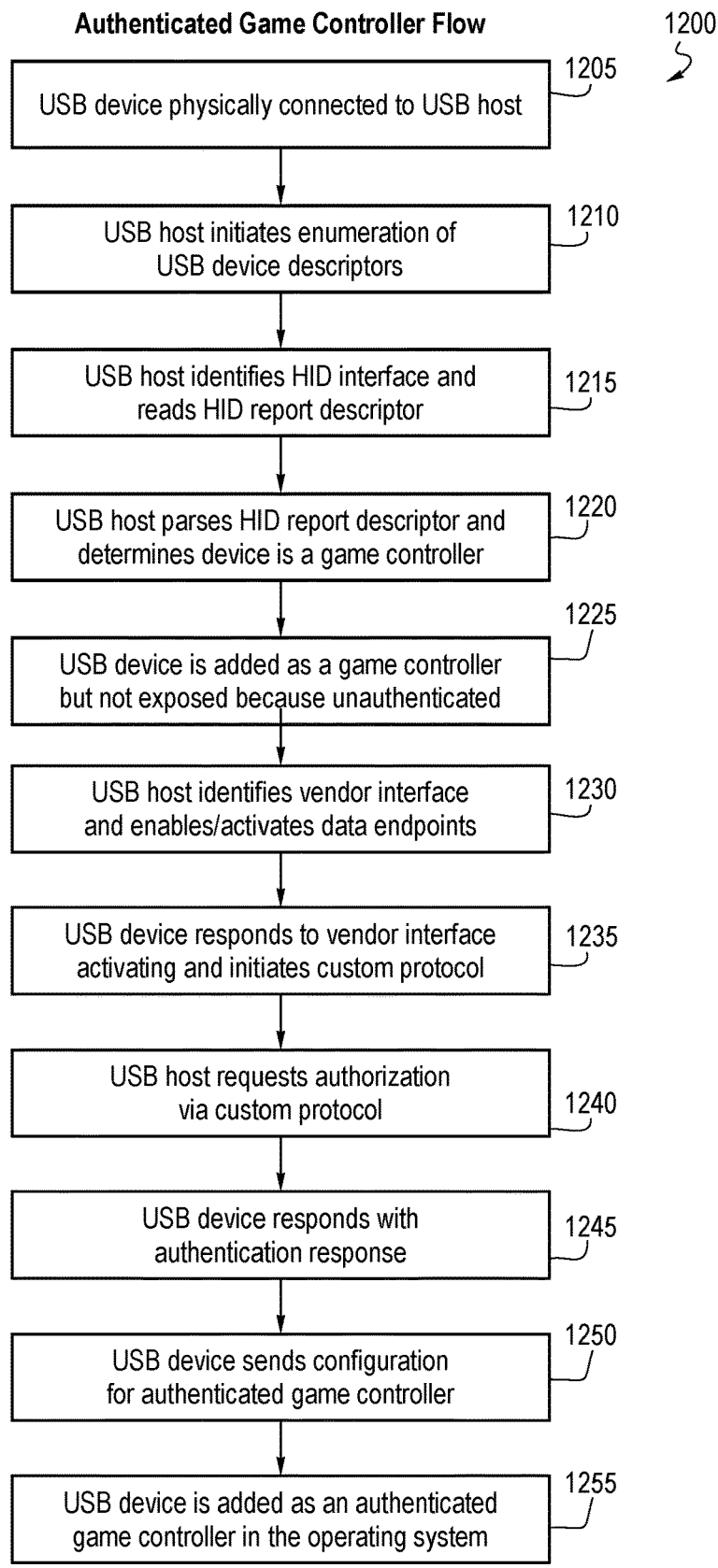
FIG. 12 is a flow chart of an authenticated game controller flow of an embodiment.

FIG. 12 is a flow chart of an authenticated game controller flow of an embodiment. As shown in FIG. 12, the USB device is physically connected to the USB host (act 1205). Then, the USB host initiates enumeration of USB device descriptors (act 1210). Next, the USB host identifies the HID interface and reads the HID report descriptor (act 1215). The USB host then parses the HID report descriptor and determines that the device is a game controller (act 1220). The USB device is added as a game controller but not exposed because the USB device is unauthenticated (act 1225). Next, the USB host identifies the vendor interface and enables/activates data endpoints (act 1230). The USB device responds to the vendor interface activating and initiates a custom protocol (act 1235). The USB host requests authorization via the custom protocol (act 1240), and the USB device responds with an authentication response (act 1245). The USB device also sends a configuration for an authenticated game controller (act 1250). Finally, the USB device is added as an authenticated game controller in the operating system (act 1255).

System Overview

In this disclosure, the system comprises a USB-C equipped game controller and a USB-C equipped computing device, typically a smartphone or other mobile device (though not necessarily limited to the type of computing device, and it should be understood that USB-C provides an example physical configuration of a connector between the two devices). In the example, the two devices communicate via USB, and the primary solution is the architecture and behavior of the game controller side of the system.

Figure 13:
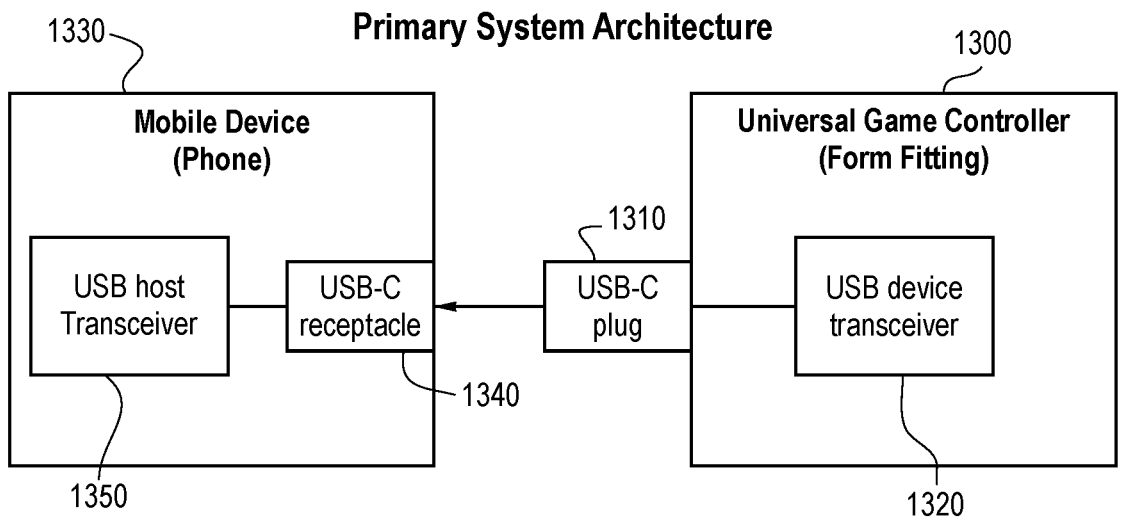
FIG. 13 is an illustration of a primary system architecture of an embodiment.

In the primary use case, the game controller is shown below connecting to a mobile phone. FIG. 13 is an illustration of a primary system architecture of an embodiment. As shown in FIG. 13, in this architecture, a universal game controller 1300 is connected, via a USB-C plug 1310, with a mobile device 1330. The universal game controller 1300 comprises a USB device transceiver 1320, and the mobile device 1330 comprises a USB-C receptacle 1340 and a USB host transceiver 1350.

Figure 14:
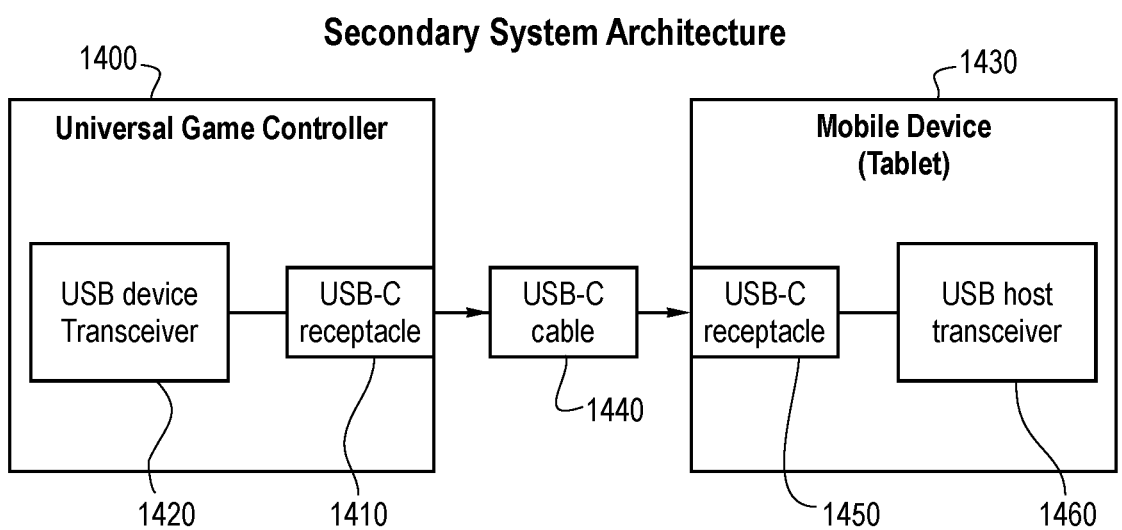
FIG. 14 is an illustration of a secondary system architecture of an embodiment.

In the secondary use case, the game controller is shown below connecting to a different class of mobile device, in this case a tablet. FIG. 14 is an illustration of a secondary system architecture of an embodiment. As shown in FIG. 14, in this architecture, a universal game controller 1400 is connected with a mobile device 1430 via a USB-C cable 1449. The universal game controller 1400 comprises a USB-C receptacle 1410 and a USB device transceiver 1420. The mobile device 1430 comprises a USB-C receptacle 1450 and a USB host transceiver 1460.

Figure 15:
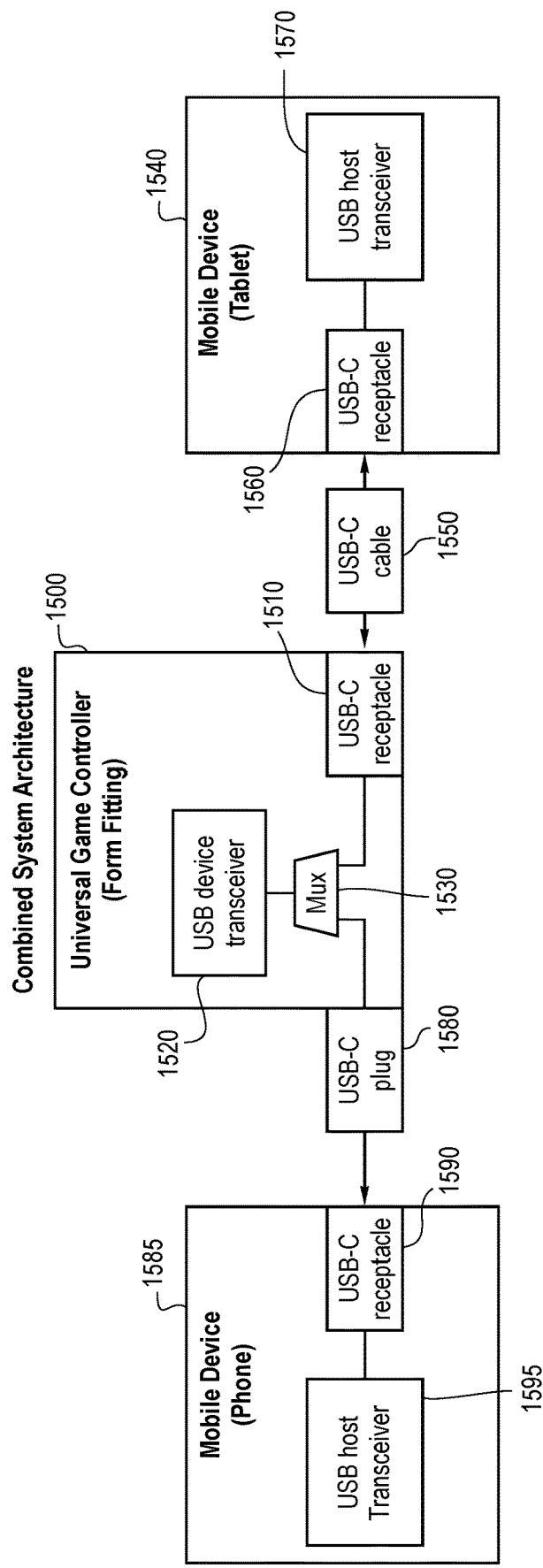
FIG. 15 is an illustration of a combined system architecture of an embodiment.

In a particular embodiment, the two use cases are combined in a single architecture. FIG. 15 is an illustration of a combined system architecture of an embodiment. As shown in FIG. 15, in this architecture, a universal game controller 1500 comprises a USB-C receptacle 1510, a USB device transceiver 1520, a multiplexor 1530, and a USB-C plug 1580. The USB-C plug 1580 connects the universal game controller 1500 with a mobile phone 1585 that comprises a USB-C receptacle 1590 and a USB host transceiver 1595. Also, a USB-C cable 1550 connects the universal game controller 1500 with a mobile device 1540 that comprises a USB-C receptacle 1560 and a USB host transceiver 1570.

Hardware Overview

Figure 16:
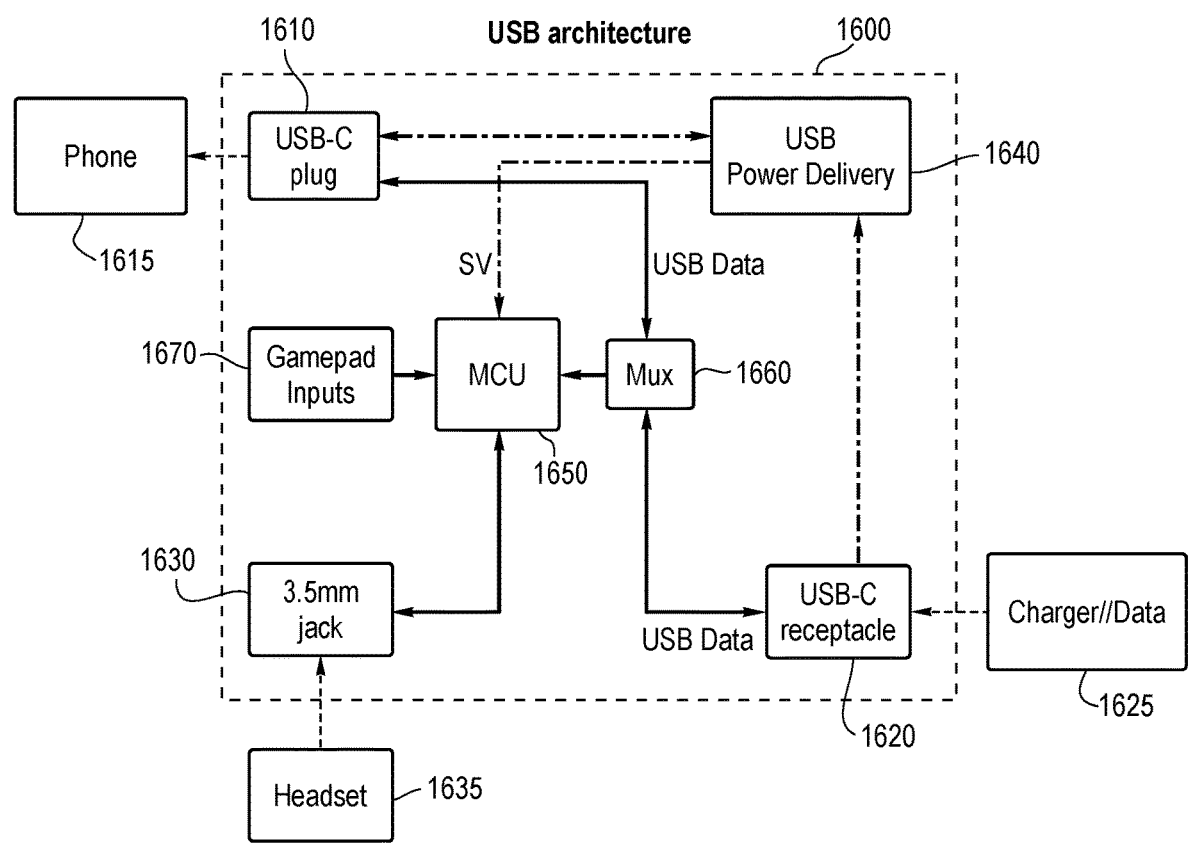
FIG. 16 is an illustration of a universal serial bus (USB) architecture of an embodiment.

A simplified block diagram of a universal serial bus (USB) architecture of an embodiment is shown in FIG. 16. This diagram shows how USB data is multiplexed in the hardware, allowing the embedded system to switch between whether the USB-C plug is active or the USB-C charging receptacle is active. Using USB-C power delivery, the system can intelligently switch power sources and roles, in addition to implementing pass through charging to the phone.

More specifically, as shown in FIG. 16, this architecture 1600 comprises a USB-C plug 1610 that connects with a phone 1615, a USB-C receptacle that connects with a charger/data element 1625, and a jack 1630 that connects with a headset 1635. The architecture 1600 also comprises an MCU 1650, a multiplexor 1660, and game inputs 1670.

Embedded System

Figure 17:
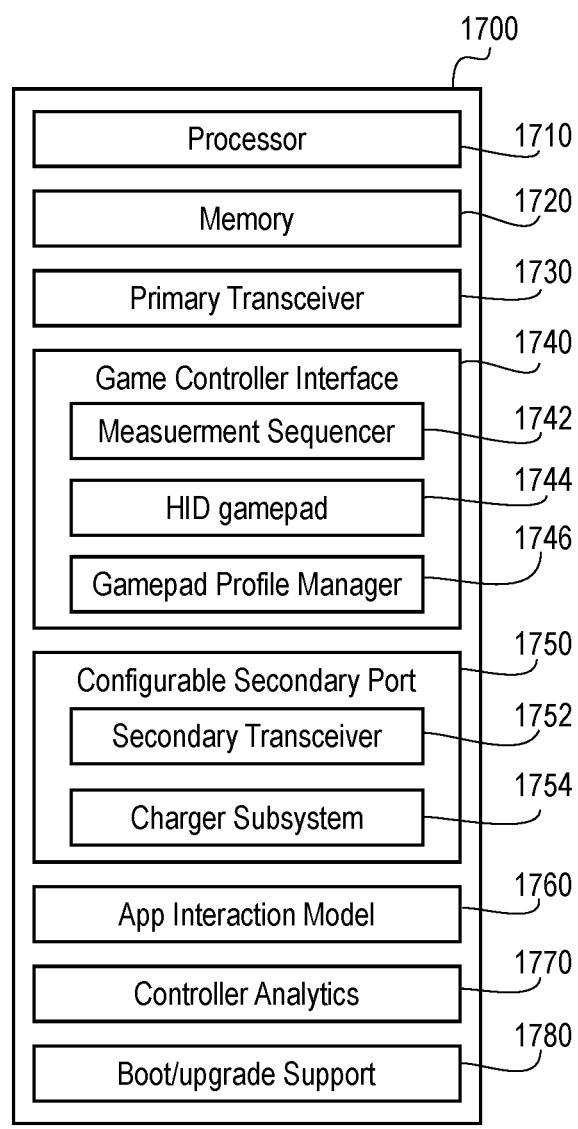
FIG. 17 is an illustration of an embedded system of an embodiment.

FIG. 17 is an illustration of an embedded system 1700 of an embodiment. As shown in FIG. 17, the embedded system 1700 comprises a processor 1710, a memory 1720, a primary transceiver 1730, a game controller interface 1740 (which comprises a measurement sequencer 1742, an HID gamepad 1744, and a gamepad profile manager 1746), a configurable secondary port 1750 (which comprises a secondary transceiver 1752 and a charger subsystem 1754), an application interaction model 1760, a controller analytics element 1770, and boot/upgrade support element 1780. In this diagram, the different blocks in the embedded system 1700 are used to implement an embodiment. The primary and secondary transceivers 1730, 1752 in this case are USB and are actually sharing the same internal USB hardware. The game controller interface 1740 implements a HID gamepad 1744 that can be dynamically reconfigured to target different USB hosts through profiles. Lastly, the embedded system 1700 has several secondary blocks which are used when interacting with the app on the smartphone.

Figure 18:
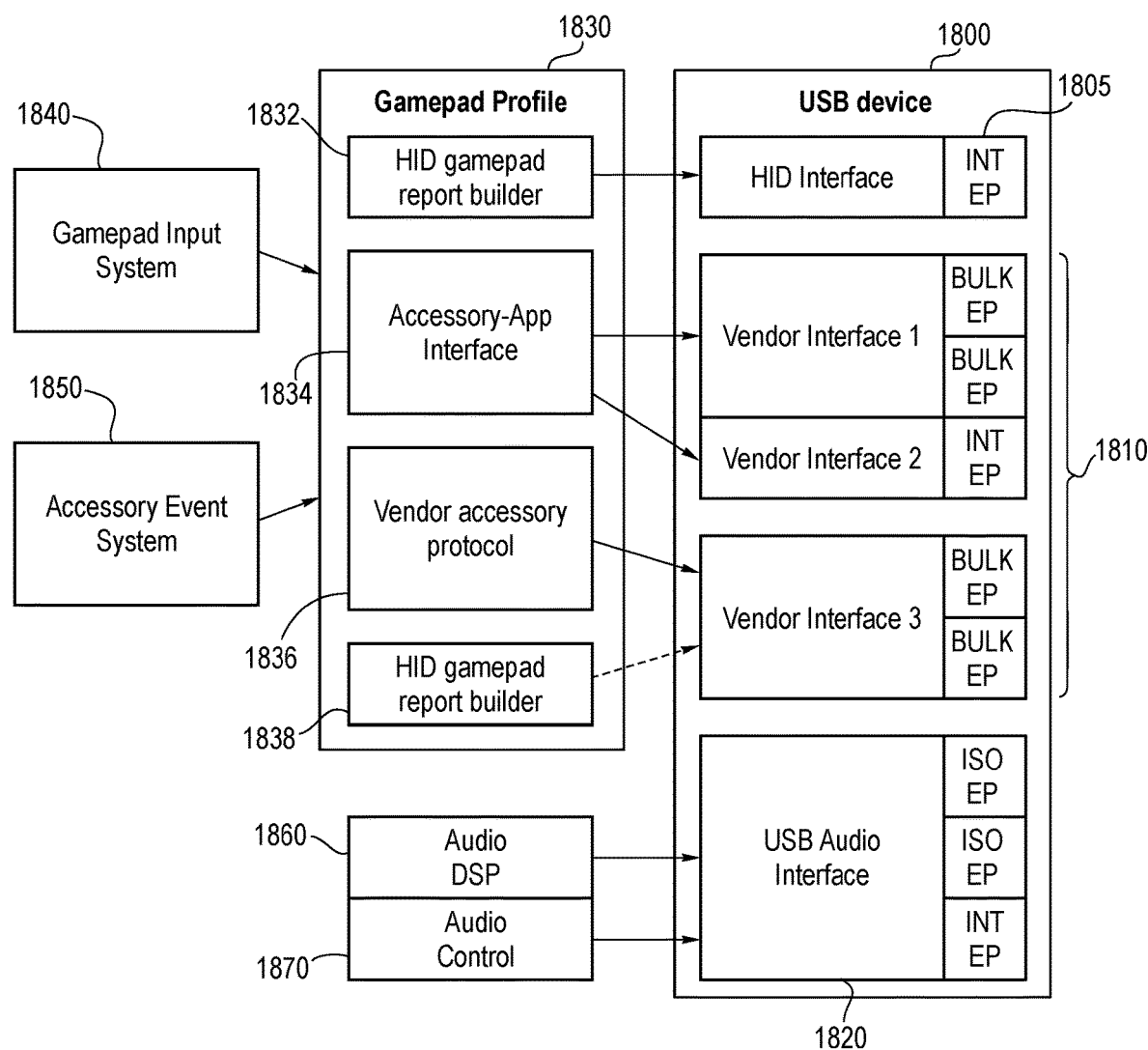
FIG. 18 is a data flow diagram of an embodiment.

FIG. 18 is a data flow diagram of an embodiment. FIG. 18 shows a USB device 1800, a gamepad profile 1830, a gamepad input system 1840, and an accessory event system 1850. The USB device 1800 comprise an HID interface 1805, various vendor interfaces 1810, and a USB audio interface 1820, which accepts audio DSP 1860 and audio control 1870 inputs. The gamepad profile 1830 comprises an HID gamepad report builder 1832, an accessory-app interface 1834, a vendor accessory protocol element 1836, and an HID gamepad report builder 1838. In this diagram, the flow of data is visualized, showing which USB interfaces are used for the various functions of the controller. In the accessory-app interface 1834, custom controller buttons and other system events are packaged up and sent on to the vendor interface 1810 via bulk endpoints. For the vendor accessory protocol 1836, the protocol is initiated automatically once the USB host responds to the start message sent via another vendor interface.

Accessory-App Architecture

Figure 19:
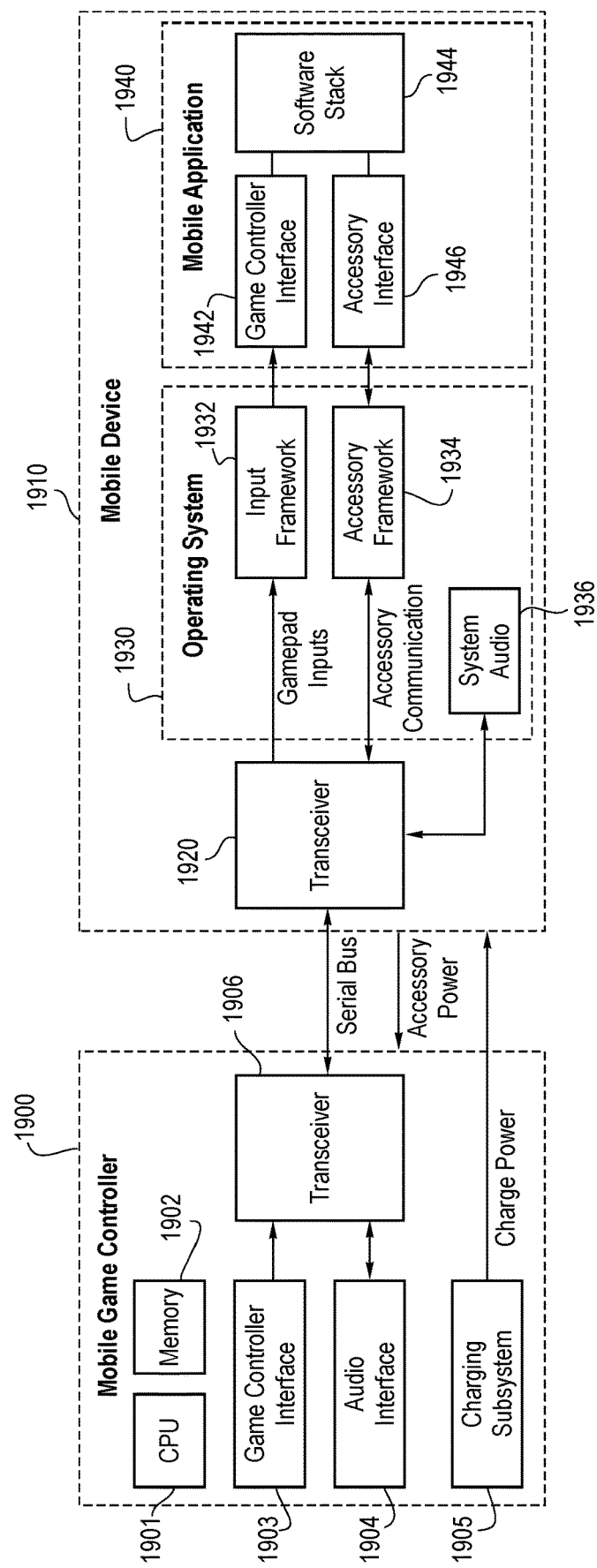
FIG. 19 is an illustration of an accessory-app architecture of an embodiment.

FIG. 19 is an illustration of an accessory-app architecture of an embodiment. This is a subset of the architecture focused on how controller inputs, audio, and accessory messages flow through the system. This diagram is more focused on the paths within the mobile computing device, with the game controller side being a bit more generalized. As shown in FIG. 19, this architecture comprises a mobile game controller 1900 and a mobile device 1910. The mobile game controller 1900 comprises a CPU 1901, a memory 1902, a game controller interface 1903, an audio interface 1904, a charging subsystem 1905, and a transceiver 1906. The mobile device 1910 comprises a transceiver 1920, an operating system 1930, and a mobile application 1940. The operating system 1930 comprises an input framework 1932, an accessory framework 1934, and system audio 1936. The mobile application 1940 comprises a game controller interface 1942, a software stack 1944, and an accessory interface 1946.

USB Device

In one embodiment, the controller operates as a USB device (rather than USB host). This is primarily due to the bus-powered nature, but also because this is the typical role for USB input peripherals. The USB descriptors include the following interfaces:

HID interface(s)
Audio control interface
Audio input interface
Audio output interface
Bulk in interface(s)
Bulk out interface(s)
Interrupt interfaces(s)

Since the device implements multiple class interfaces, we consider this a composite device. In simple terms, a composite device is a device with multiple functions. For example, when connected to a PC, you would see not only a human interface device connected, but also an audio device connected, both of which are grouped within a composite device collection. In addition, the descriptor below includes audio interfaces, but audio is optional for purposes of the embodiments. However, the automatic detection of the mobile device is actually quite useful to handle differences in how audio is handled across the major mobile operating systems.

Using a flexible game controller profile system, we are able to support multiple permutations of USB descriptors. In the diagrams below, we show distinct profiles for Android and iOS, and a third profile which is designed to support both simultaneously.

Figure 20:
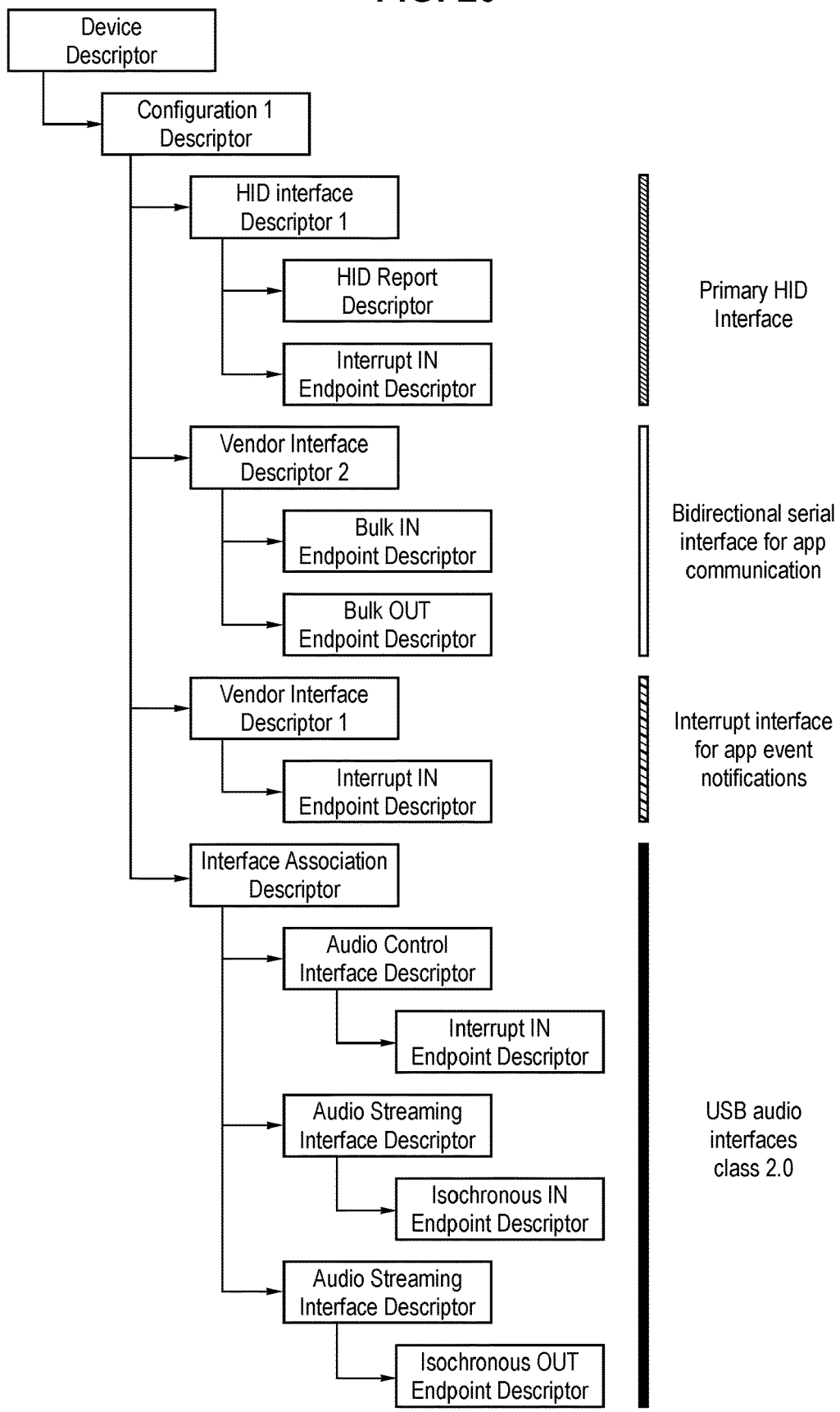
FIG. 20 is an illustration of Android USB device descriptors of an embodiment.
Figure 21:
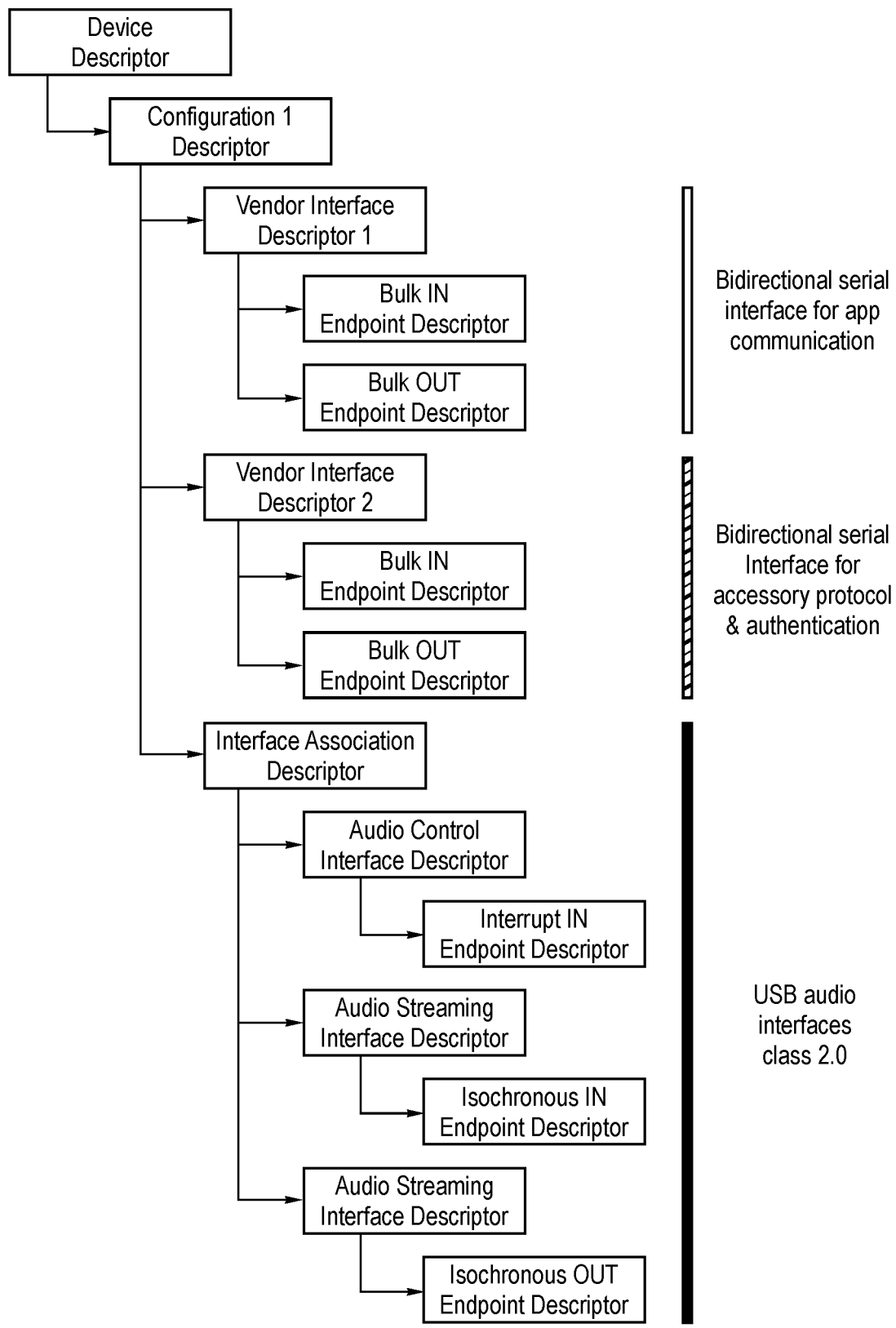
FIG. 21 is an illustration of iOS USB device descriptors of an embodiment.
Figure 22:
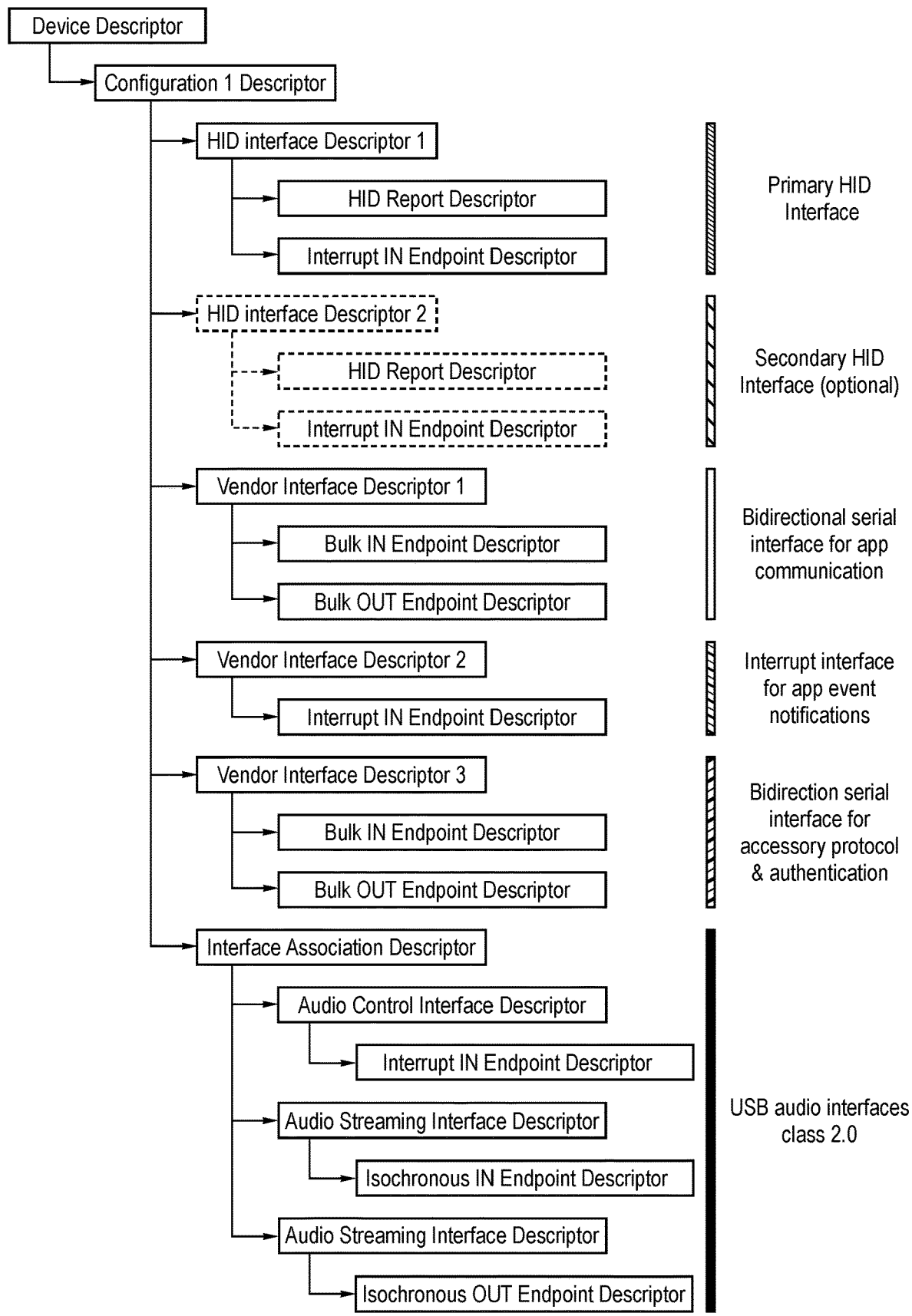
FIG. 22 is an illustration of full device descriptors of an embodiment.

FIG. 20 is an illustration of Android USB device descriptors of an embodiment. FIG. 21 is an illustration of iOS USB device descriptors of an embodiment. FIG. 22 is an illustration of full device descriptors of an embodiment.

HID Interfaces

One element of the universal mobile game controller is the ability to expose multiple HID interfaces. Each mobile device may have its own set of requirements and button mappings for HID game controllers, and therefore having multiple HID interfaces can allow for correct button mappings per platform. Although USB does attempt to standardize HID usage values, it leaves the interpretation of various game controller buttons up to the host. As a result, each platform has a slightly different HID report descriptor to make game controllers work properly.

HID interfaces can either be presented through a standard USB interface with the HID class identifier, or can be established through a vendor interface via a custom accessory protocol. The custom accessory protocol can also be used to specify which USB HID interface to use in the event there are multiple included in the USB device configuration. In this alternate embodiment, the primary HID interface would be used for an unauthenticated game controller, and a secondary HID interface would be used for an authenticated game controller. The secondary HID interface only gets utilized once a vendor message is exchanged to specify the interface number of the desired interface.

Vendor Interfaces

The automatic aspect of the universal mobile game controller is partially achieved through vendor interfaces. In USB, a vendor interface is just a standard interface with a vendor class identifier. On most USB hosts, unknown vendor protocols are generally ignored unless a specific device driver is installed in the system. This behavior can be used to expose a superset of required host functionalities without negatively affecting the core device support. For example, a vendor interface can be used to implement a host specific accessory protocol which is required for one platform, but ignored on the other.

In some embodiments, vendor interfaces can be reused across host platforms. For example, the vendor interface for establishing bulk data communication between the mobile game controller and mobile application can be reused because this paradigm can be easily implemented by multiple platforms. By sharing the USB interface and endpoints in this case, the total number of endpoints in use can be reduced, freeing up resources for host specific interfaces and endpoints.

Audio Interfaces

In some embodiments, the mobile game controller can expose USB audio capabilities on top of the existing HID and vendor capabilities. USB audio class support is generally standardized across hosts. However, in certain embodiments, the audio control behaviors can be treated differently.

For example, some USB hosts may opt to handle their audio volume differently, such as implement source scaled volume rather than rely on the USB device to scale the volume. In this case, the mobile game controller can use the vendor interfaces to identify which host vendor is connected, and change its behavior accordingly.

In some embodiments, the USB host may not fully support USB audio class 2.0 features. In the event the host does not support the audio connector request for example, the mobile game controller can decide to re-enumerate in a secondary USB configuration that utilizes a reduced set of audio capabilities for better compatibility.

Automatic Switching

In one embodiment, a combined USB descriptor is used which can support both Android and iOS. The primary HID descriptor is designed for use on Android, which falls under the category of unauthenticated game controller described previously. When this same descriptor is seen on iOS, it does not get immediately used because the system requires authentication first. USB vendor interfaces are instead used to authenticate the device and also communicate the details of the game controller. The controller will attempt to initiate a custom protocol with the iOS device on the vendor interface, which will have no effect on Android, but is recognized on iOS. Once the device has completed authentication, it will present a HID descriptor that describes the controller for the iOS platform. Once the device is authenticated and the game controller configuration is accepted, the device knows to switch its internal game controller processing to use the vendor interface instead of the USB HID interface.

USB Host Fingerprinting

In certain embodiments, the detection of the USB host can be achieved by "fingerprinting" the USB host based on the characteristics of its communication. In this context, fingerprinting is referring to identifying characteristics of the USB host behavior in a way that can uniquely identify the host from other hosts. In this alternative approach, the USB device makes a decision during USB enumeration based on various techniques. For example, a certain USB host may make specific or unique USB requests during enumeration that other hosts do not implement. This can be a signal to re-enumerate as a different device variation for that host. Similarly, a USB host may have a very particular behavior or sequence in how it interrogates interfaces. For example, if a USB host requests string identifiers or other relevant descriptors on a custom vendor interface this can imply the host inherently recognizes the interface, and can be used to infer the host's capabilities.

Figure 23:
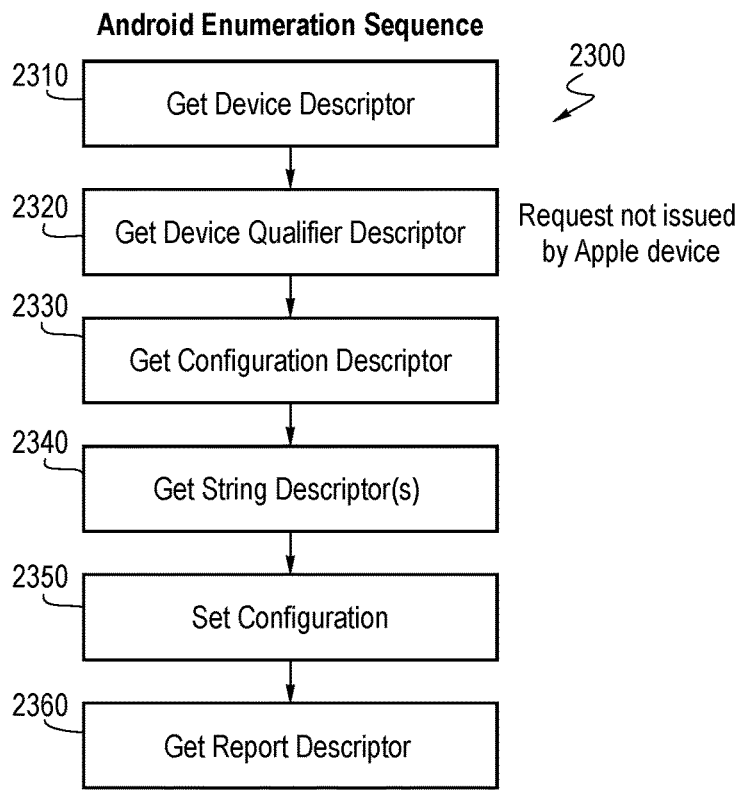
FIG. 23 is an illustration of an Android enumeration sequence of an embodiment.
Figure 24:
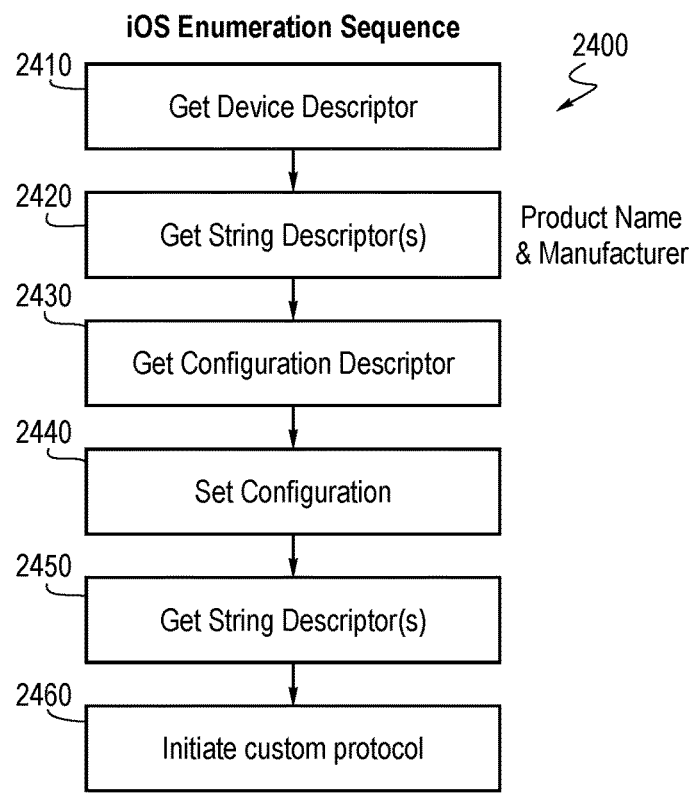
FIG. 24 is an illustration of an iOS enumeration sequence of an embodiment.

FIG. 23 is an illustration of an Android enumeration sequence 2300 of an embodiment. As shown in FIG. 23, this sequence 2300 comprises getting the device descriptor (act 2310), getting the device qualifier descriptor (act 2320), getting the configuration descriptor (act 2330), getting the string descriptor (act 2340), setting the configuration (act 2350), and getting the report descriptor (act 2360). FIG. 24 is an illustration of an iOS enumeration sequence 2400 of an embodiment. As shown in FIG. 24, this sequence 2400 comprises getting the device descriptor (act 2410), getting the string descriptor(s) (act 2420), getting the configuration descriptor (act 2430), setting the configuration (act 2440), getting the string descriptor(s) (act 2450), and initiating custom protocols (act 2460). These diagrams show the differences between host enumeration patterns.

In the Android enumeration case, there is a device qualifier descriptor request before the configuration descriptor is requested. This gives the USB device the opportunity to set up a specific configuration descriptor ahead of time. In the event the device qualifier descriptor is not requested, the device will default to the iOS based configuration. This particular approach is desirable since it technically does not require the USB device to restart or re-enumerate.

For the above embodiment, the USB device can use more compact versions of its descriptors, which are more or less a subset of the combined superset descriptors.

Figure 25:
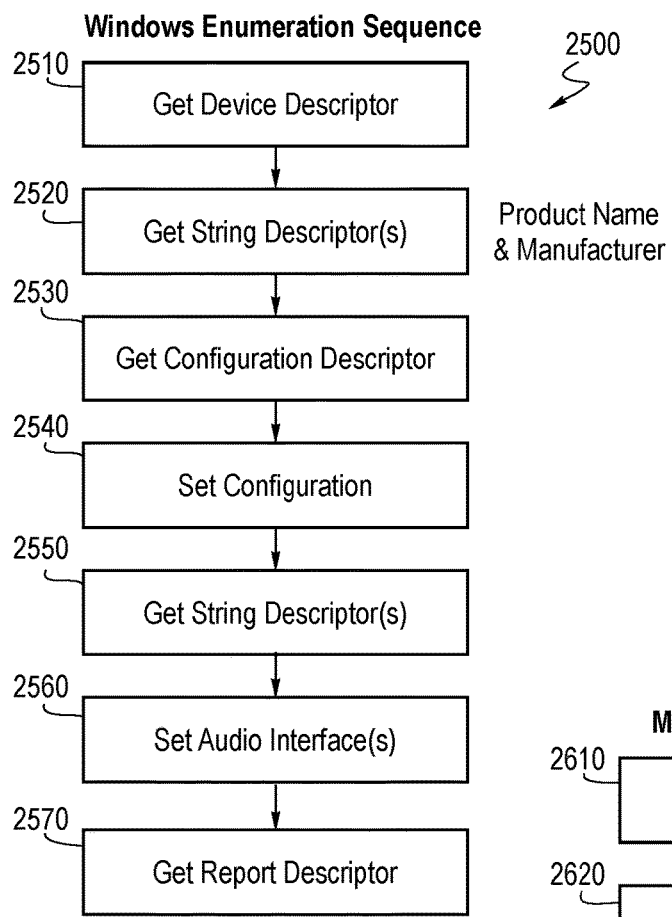
FIG. 25 is an illustration of a Windows enumeration sequence of an embodiment.
Figure 26:
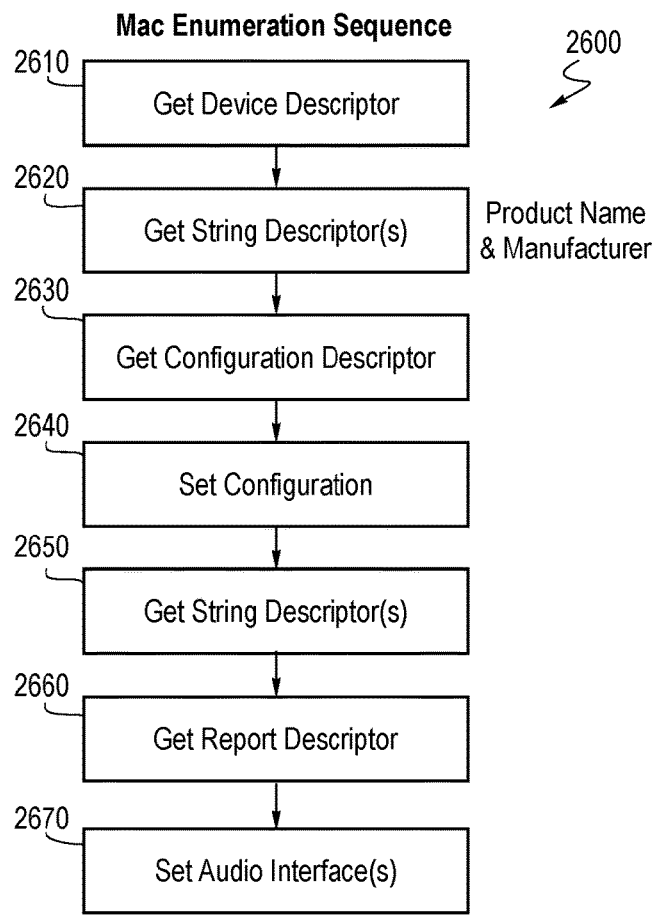
FIG. 26 is an illustration of a Mac enumeration sequence of an embodiment.

In another example, a Windows and Mac USB host enumeration sequence can be compared. FIG. 25 is an illustration of a Windows enumeration sequence 2500 of an embodiment. As shown in FIG. 25, this sequence 2500 comprises getting the device descriptor (act 2510), getting the string descriptor(s) (act 2520), getting the configuration descriptor (act 2530), setting the configuration (act 2540), getting the string descriptor(s) (act 2550), setting the audio interface (act 2560), and getting the report descriptor (act 2570). FIG. 26 is an illustration of a Mac enumeration sequence 2600 of an embodiment. As shown in FIG. 26, this sequence 2600 comprises getting the device descriptor (act 2610), getting the string descriptor(s) (act 2620), getting the configuration descriptor (act 2630), setting the configuration (act 2640), getting the string descriptor(s) (act 2650), getting the report descriptor (act 2660), and setting the audio interface (act 2670).

In this example, the initial sequence between Windows and Mac are very similar. However, later in the sequence there is a difference in when the audio interfaces are requested relative to the HID report descriptor request. This gives the device an opportunity to dynamically swap out the HID report descriptor content based on what sequence of requests is encountered. In this example, the length of the HID report descriptor has to be declared early on when the configuration descriptor is read. Therefore, the descriptor length has to be the same for Windows and Mac. This can be worked around by manipulating the HID report descriptor by adjusting the organization of fields within the descriptor. For example, adding in padding bits or explicitly declaring field sizes can increase the size artificially to match the size requirements.

Secondary Port

In some embodiments, the game controller can be manually reconfigured into a specific profile for use with non-mobile devices such as a PC, or any platform that does not fully conform to the paradigms described above. Although the unauthenticated game controller could still be made to work with a PC via button remapping, there is still value in arranging the button inputs based on the platform.

In this embodiment, the secondary USB port can be reconfigured as a static, non-automatic game controller profile that targets a single platform. The specific profile can be selected through commands exchanged through one of the vendor interfaces. This command exchange can either be done in advance, such as through a smart phone app using the primary connector, or can be configured directly on the target platform by an app. In such an embodiment, the universal game controller logic is itself a setting in a configurable profile system.

Figure 27:
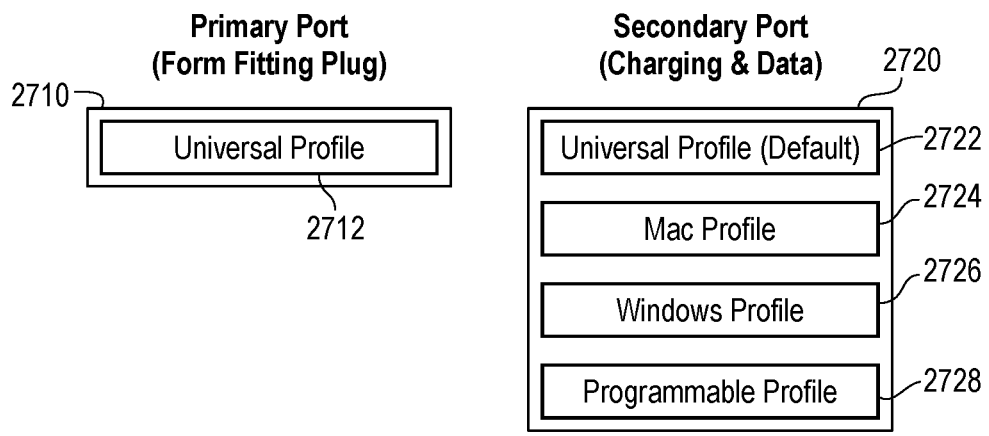
FIG. 27 is an illustration of primary and secondary ports of an embodiment.

FIG. 27 is an illustration of primary and secondary ports 2710, 2720 of an embodiment. The primary port 2710 comprises a universal profile 2712, and the secondary port 2720 comprises a default universal profile 2722, a Mac profile 2724, a Windows profile 2726, and a programmable profile 2728. In this arrangement, the primary port 2710 is automatically configured for use with mobile operating systems, and the secondary port 2720 is user configurable. By default, the universal profile can be used to expand support to Android and Apple tablets, which share compatibility with their phone equivalents. However, the user may want to enable other kinds of devices which can be achieved by switching the profile setting within the device. The configurable port can be set to one of many options, one of which being a completely flexible profile that can be programmed dynamically.

In some embodiments, a programmable profile is implemented which allows for the USB device descriptors to be written dynamically by an application and stored into persistent memory. This allows for additional support of new USB host platforms in the future, and largely eliminates any memory limitations caused by a large number of profile permutations.

Figure 28:
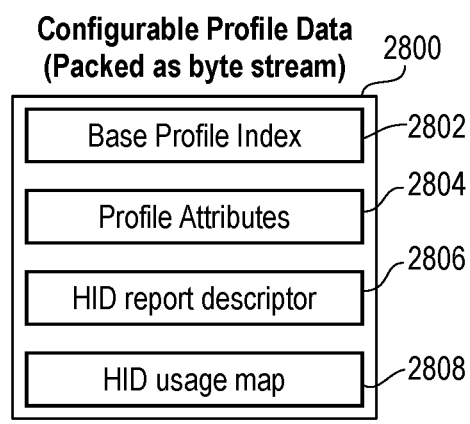
FIG. 28 is an illustration of configurable profile data of an embodiment.

FIG. 28 is an illustration of configurable profile data 2800 of an embodiment. In this arrangement, there are four sections of the profile data which get transmitted from the mobile application and written into the USB device:

Base Profile Index 2802—Specifies which base profile to use for this custom profile. Usually this is a standard HID game controller, but could also point to any other built-in profiles such as universal, windows, mac, etc.

Profile Attributes 2804—Specifies attributes of the game controller such as controller input rate, joystick deadzone, etc.

HID report descriptor 2806—Specifies the report descriptor to present when enumerating over USB (or custom protocol).

HID usage map 2808—Specifies how the physical controller inputs of the product map to the usage values presented in the HID report descriptor.

Physical Switch

In some embodiments, the product may have a physical switch or button to alternate between support game controller profiles. Leveraging the same profile system that is used for the secondary port, this can also be applied to the primary port. In this embodiment, there would be a physical switch on the product such as a two-position slide switch. When the position of the switch changes, the controller will load a different profile (e.g. Android to the left, iOS to the right).

In other embodiments, the product may opt to reuse an existing controller button rather than adding a switch. In this case, the user would hold the button down (for example a specific directional pad button) while connecting their phone which can inform the controller which profile to use at startup.

USB Audio Volume

As a side effect of the automatic detection of the host device, the controller can also apply this knowledge to other aspects of the USB device such as audio. For example, on Android the USB audio implement is non-standard in that it does not use standard volume messages and, instead, scales the content based on the volume level. However, on an iOS device, the host does not scale the content and instead uses standard volume messages to have the USB device apply the attenuation. This difference in volume behavior makes it difficult to build a product that works well for both. If you applied volume control on the device side on Android, the attenuation would be twice as strong because both sides of the system are scaling for volume.

To address this, the outcome of the automatic switching behavior can be used to inform the USB device what it is connected to. So, if the device determines it is connected to an Android device, it can disable its own volume scaling so as to not interfere with the phone's built in volume scaling. Conversely, if it detects an iOS device, it can continue to use the standard USB audio volume behavior where the device applies its own volume scaling. Usually, you want to implement volume scaling on the device doing the audio rendering for highest quality, but not all USB hosts operate this way.

USB Connector Support

For USB audio, there are multiple versions of the USB audio class that can be supported by the host. USB audio 1.0 is the baseline and is widely supported. However, USB audio class 2.0 is not quite as ubiquitous. One convenient feature of USB audio class 2.0 is the ability to implement an audio connector. This connector mechanism allows for the USB device to dynamically turn its audio support on/off based on the presence on the connector. For example, you would only want audio to stream out of the phone when a 3.5 mm jack is plugged in. If the jack was unplugged, you would want the audio to stream from the phone's speaker.

Unfortunately, some phones do not support the USB audio connector feature. In this situation, the phone will always route audio to the USB device regardless of the audio jack state. To a user, this is very confusing because the audio is not heard despite no headphones plugged in. To address this, a process was established which allows the USB device to infer whether the audio support is available.

When the USB device is first connected, it will use the interrupt endpoint associated with this audio connector control, and wait for the USB host to inquire about the connector state. If the USB host does not send a request within a couple hundred milliseconds, the device can infer that USB audio 2.0 is not fully supported and can reboot into a mode which omits USB audio from the descriptors entirely. When the audio jack is plugged in however, the USB device can reboot into its original audio mode to restore audio functionality. In addition, to prevent extra switching, the USB device can remember the last USB host it was connected to. So if the last time it was connected was on a phone without USB audio 2.0 support, it can boot up in the appropriate state to reduce an extra reboot. Of course, any time the audio jack is plugged in, we always need to load the full audio descriptors.

Figure 29:
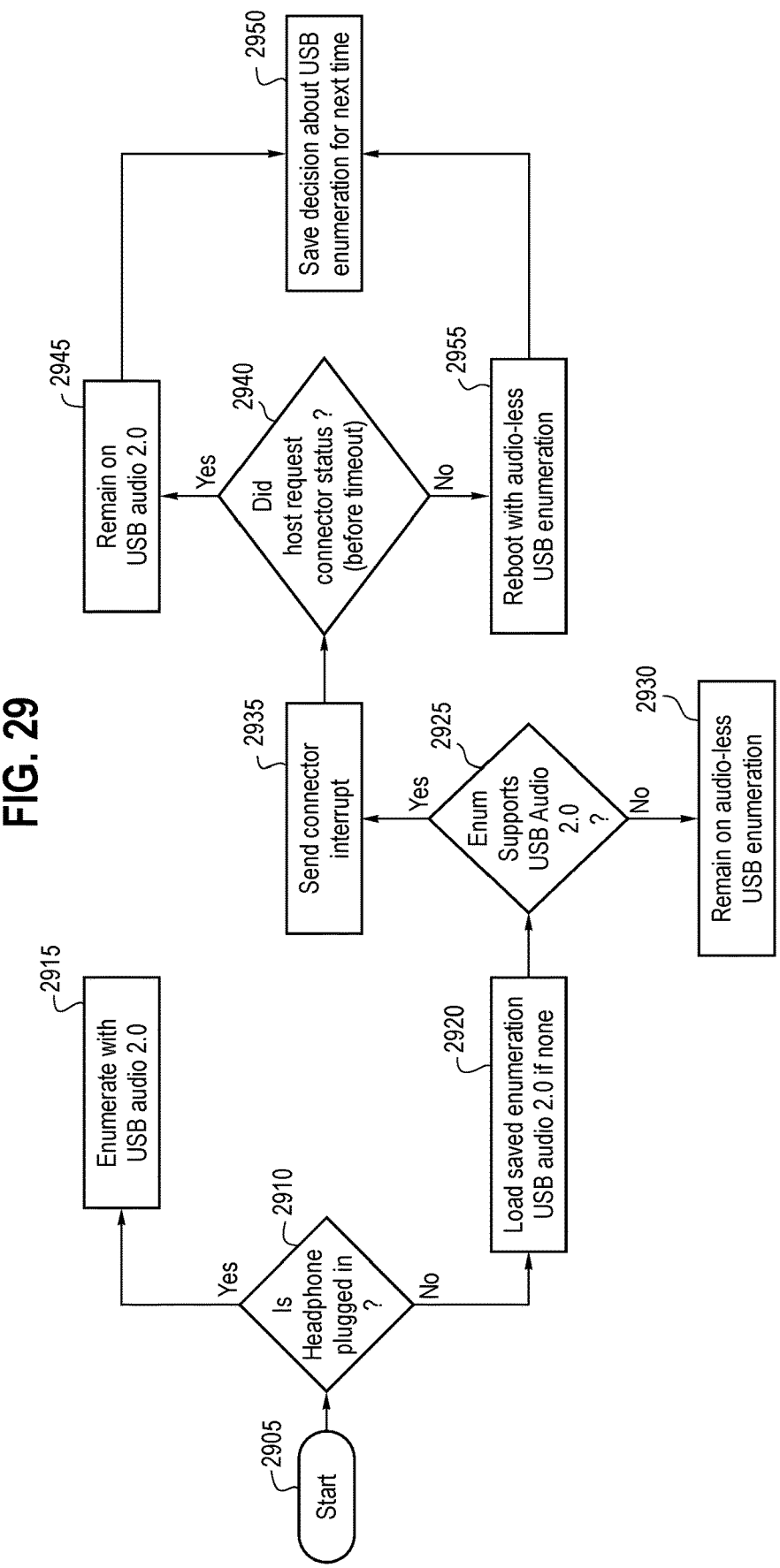
FIG. 29 is a flow chart of a method for USB audio switching of an embodiment.

FIG. 29 is a flow chart 2900 of a method for USB audio switching of an embodiment. As shown in FIG. 29, after the method starts (act 2905), a determination is made on whether a headphone is plugged in (act 2910). If a headphone is plugged in, the device is enumerated with USB audio 2.0 (act 2915). If a headphone is not plugged in, a saved enumeration is loaded, or USB audio 2.0 is used if there is no saved enumeration (act 2920). Next, a determination is made on whether the enumeration supports USB 2.0 audio (act 2925). If the enumeration does not support USB audio 2.0, the device remains on an audio-less USB enumeration (act 2930). However, if the enumeration does support USB audio 2.0, a connect interrupt is sent (act 2935). Then, a determination is made on whether the host requested connector status before timeout (act 2940). If it did, the device remains on USB audio 2.0 (act 2945); otherwise, the device is rebooted with audio-less USB enumeration (act 2955). Either way, a decision about USB enumeration is saved for next time (act 2950).

There are several advantages associated with these embodiments. Some advantages include automatic switching between Android and iOS allowing for a single product to be used for both platforms which greatly reduces customer confusion, especially when the USB-C connector is common between the phone vendors.

CONCLUSION

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A game controller comprising:
   a connector;
   at least one processor;
   a non-transitory computer-readable medium; and
   program instructions stored on the non-transitory computer-readable medium that, when executed by the at least one processor, cause the at least one processor to perform functions comprising:
      sending to a host connected to the game controller via the connector both (i) a first set of descriptors configured to enable a first operating system to use the game controller and (ii) a second set of descriptors configured to enable a second operating system to use the game controller, wherein both the first and second sets of descriptors are sent to the host irrespective of which one of the first and second operating systems the host uses.

2. The game controller of claim 1, wherein the first and second sets of descriptors comprise a device descriptor, a configuration descriptor, a human interface device (HID) descriptor, and/or a vendor descriptor.

3. The game controller of claim 1, wherein the program instructions, when executed by the at least one processor, further cause the at least one processor to perform functions comprising:
   sending the first and second sets of descriptors to the host in response to a request from the host for the game controller to identify itself during an enumeration process.

4. The game controller of claim 1, wherein the first operating system comprises Android and the second operating system comprises iOS.

5. The game controller of claim 1, wherein the connector comprises a Universal Serial Bus (USB)-C connector.

6. A method comprising:
   performing in a universal serial bus (USB) device in communication with a host via a connector:
      receiving, from the host, a request for the USB device to identify itself during an enumeration process; and
      in response to receiving the request, sending, to the host, a first set of descriptors configured to enable a first operating system to use the USB device and a second set of descriptors configured to enable a second operating system to use the USB device, wherein one or both of the first and second sets of descriptors are usable by both the first and second operating systems.

7. The method of claim 6, wherein the first and second sets of descriptors comprise a device descriptor, a configuration descriptor, a human interface device (HID) descriptor, and/or a vendor descriptor.

8. The method of claim 6, wherein the first and second sets of descriptors are further configured to provide an audio setting to the host.

9. The method of claim 6, wherein the first operating system comprises Android and the second operating system comprises iOS.

10. The method of claim 6, wherein the connector comprises a USB-C connector.

11. The method of claim 6, wherein the USB device comprise a game controller.

12. A non-transitory computer-readable medium storing program instructions that, when executed by one or more processors in a mobile game controller, cause the one or more processors to perform functions comprising:
   sending to a host in communication with the mobile game controller both (i) a first set of descriptors configured to enable a first operating system to use the mobile game controller and (ii) a second set of descriptors configured to enable a second operating system to use the mobile game controller:
   wherein:
      both the first and second sets of descriptors are sent to the host irrespective of which one of the first and second operating systems the host uses; and
      the host is configured to authenticate the game controller using one of the first and second sets of descriptors and use the other set of descriptors after the game controller has been authenticated.

13. The non-transitory computer-readable medium of claim 12, wherein:
   the mobile game controller is in communication with the host via a first connector; and
   the program instructions, when executed by the one or more processors, further cause the one or more processors to perform functions comprising:
      sending the first and second sets of descriptors to another host connected to the mobile game controller via a second connector.

14. The non-transitory computer-readable medium of claim 12, wherein:
   the mobile game controller is in communication with the host via a first connector; and
   the program instructions, when executed by the one or more processors, further cause the one or more processors to perform functions comprising:
      sending a set of descriptors different from the first and second sets of descriptors to another host connected to the mobile game controller via a second connector.

15. The non-transitory computer-readable medium of claim 12, wherein the mobile game controller is in communication with the host via a Universal Serial Bus (USB)-C connector.

16. The non-transitory computer-readable medium of claim 12, wherein the first operating system comprises Android and the second operating system comprises iOS.

* * * * *